(12) United States Patent
Hagiwara et al.

(10) Patent No.: US 9,405,769 B2
(45) Date of Patent: Aug. 2, 2016

(54) SEARCHING FOR DEVICES IN AN INFORMATION TECHNOLOGY ENVIRONMENT WITH AID OF MAPS

(71) Applicants: Kenji Hagiwara, Edgewater, NJ (US); Michael Charity, Newark, NJ (US)

(72) Inventors: Kenji Hagiwara, Edgewater, NJ (US); Michael Charity, Newark, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 275 days.

(21) Appl. No.: 14/151,124

(22) Filed: Jan. 9, 2014

(65) Prior Publication Data

US 2015/0193469 A1   Jul. 9, 2015

(51) Int. Cl.
*G09G 5/02* (2006.01)
*G06F 17/30* (2006.01)
*G06Q 10/10* (2012.01)

(52) U.S. Cl.
CPC .......... *G06F 17/30241* (2013.01); *G06Q 10/10* (2013.01)

(58) Field of Classification Search
None
See application file for complete search history.

(56) References Cited

U.S. PATENT DOCUMENTS

| 8,185,887 | B2 | 5/2012 | Hattori | |
|---|---|---|---|---|
| 2002/0059211 | A1* | 5/2002 | Kuramochi | G06Q 10/06 |
| 2007/0101282 | A1* | 5/2007 | Goossen | G09G 5/14 715/764 |
| 2007/0174869 | A1* | 7/2007 | Kim | G06F 3/03547 725/37 |
| 2007/0250330 | A1* | 10/2007 | Chen | G06Q 10/00 707/723 |
| 2010/0162158 | A1* | 6/2010 | Dittmar | G06F 3/0482 715/780 |
| 2014/0114931 | A1* | 4/2014 | Cline | H04L 67/18 707/690 |

OTHER PUBLICATIONS

U.S. Appl. No. 13/758,082, Kenji Hagiwara et al., filed Feb. 4, 2013.
U.S. Appl. No. 13/758,089, Kenji Hagiwara et al., filed Feb. 4, 2013.
U.S. Appl. No. 13/758,097, Kenji Hagiwara et al., filed Feb. 4, 2013.
U.S. Appl. No. 13/758,110, Greg Anderson et al., filed Feb. 4, 2013.
U.S. Appl. No. 14/151,114, Kenji Hagiwara et al., filed Jan. 9, 2014.

* cited by examiner

*Primary Examiner* — Kee M Tung
*Assistant Examiner* — Frank Chen
(74) *Attorney, Agent, or Firm* — Cooper & Dunham LLP

(57) ABSTRACT

Systems, apparatuses and methods are provided for a user of a terminal to locate a device, with aid of a digital map. In addition, the user is provided with a user interface to add a device to a map.

17 Claims, 30 Drawing Sheets

Add Building Information

Step 1: Building Properties

Building Name: New Office

Street Address: 18-86 Invention St. Pittsburgh, PA 30023

[ Next Step ]

---

Step 2: Define Floors            Edit

Number of Floors: 0

---

Step 3: Define Workgroups        Edit

Number of Workgroups: 0

Fig. 7C

Add Building Information

Step 1: Building Properties          Edit

Building Name: New Office

Street Address: 18-86 Invention St. Pittsburgh, PA 30023

---

Step 2: Define Floors          Edit

Number of Floors: 3

1. Ground

2. Cafeteria/Theatre

3. Offices

---

Step 3: Define Workgroups

[3. Offices ▼]   Number of Workgroups   [ 2 ⬍ ]

Workgroup Name

[ Engineers ]

[ Managers ]

---

[ Cancel ]   [ Add More ]   [ Next ]

Fig. 7E

Register Devices

| | Walkthrough ID | Manufacturer | Device Name | Device Type | Status |
|---|---|---|---|---|---|
| ☒ | 1 | Canon | PIXMA 600 | Printer | Working |
| ☐ | 2 | Ricoh | Aficio 2075 | MFP (mono) | Broken |
| ☐ | | Ricoh | Aficio 1097 | MFP (color) | Out of Paper |
| ☐ | 3 | HP | ENVY 4500 | Printer | Good |
| ☐ | | Xerox | D95 | MFP (color) | Working |

[ Ricoh ]   [ Search ]

[ Edit ]  [ Add ]  [ Import ]  [ Delete ]  [ More Details ]

[ Back ]  [ Next ]

Fig. 7F

| Item | Description |
| --- | --- |
| System ID | System IDs assigned to each device by system. |
| Walkthrough ID | Walkthrough IDs assigned to each device by analyst. |
| Manufacturer Name | Manufacturer Name of the device |
| Device Name | Model Name of the device<br>When users add their defined device, users can enter the product name. |
| Device Type | Device Type (i.e. MFP, Printer, etc.) |
| Device Age (months) | Age of the device (i.e. days, months, years) |
| Out of Scope | The device is out of scope for TCO calculation or not |
| Serial Number | Serial Number |
| Asset Tag | Asset Tag |
| IP Address | IP Address |
| MAC Address | MAC Address |
| SAP Address | SAP Address |
| Queue Name | Queue Name |
| Host Name | Host Name |
| Room | Room where the device is placed |
| Cube | Cube where the device is placed |
| Business Unit | Business Unit the device placed |
| Department | Department the device placed |
| Division/Cost Center | Decision/Cost Center for the device |
| Monthly Volume Mono | Monthly total Mono volume (counter) |
| Monthly Volume Color | Monthly total Color volume (counter) |
| Connectivity (Network, Local, Not Connected) | Connectivity of the device |
| Total Monthly Cost | Total Monthly Cost calculated by the system. |
| Total Cost Per Paper | Total Cost per Paper calculated by the system |
| Custom Field1 - 10 | User Defined Custom Fields. The field name is displayed as a value configured in Enterprise Level - Parameter Tab. |

Fig. 12

SEARCHING FOR DEVICES IN AN INFORMATION TECHNOLOGY ENVIRONMENT WITH AID OF MAPS

TECHNICAL FIELD

This disclosure relates to tools (such as systems, apparatuses, methodologies, computer program products, etc.) for users to locate devices, with aid of digital maps.

BACKGROUND

In the current information age, there are often discussions of the desirableness of a paperless society. However, notwithstanding such discussions, there remains a need by users of computers and information terminals for printing functionality. Therefore, devices having printing functionality, such as printers, copiers, multi-function devices, etc., continue to play a significant role in information technology (IT) at home and at work. Other devices (including, but not limited to, scanners, shredders, projectors, whiteboards, kiosks, etc.) may also be deployed in the typical IT environment.

Further, mobile devices such as smartphones, notebook and laptop computers, PDAs (personal digital assistants), tablet computing devices, and so forth, are becoming extremely prolific. Such devices allow the user to access documents, data and other content in many different locations. In many cases, a mobile device is employed to access information, while the user is on-the-go, in an IT environment with which the user may not be familiar and/or in which the user is unaware of the IT resources available therein.

In such mobile culture, digital maps and floor plans (each of which is broadly referenced herein as a "map") can be employed to assist the user to locate devices, people, objects, etc. However, maps alone can be cumbersome to use, since the density of information on a map can be overwhelming, while the utility of a map is to provide the general or specific location of a person, device, object, etc.

There remains a need for improvements to allow users to optimize use of digital maps.

SUMMARY

Various tools (for example, a system, an apparatus, application software, etc.) can be configured to provide additional features for improved use of digital maps.

In an aspect of this disclosure, such features may be integrated in a device information management application that is configured to register devices and associated device locations on registered floormaps accessible through a floormap interface. Further, a search interface is provided for user entry of device search terms, and such search terms are matched to the registered device information, to return a list of matched devices. The floormap interface includes (i) a device listing display portion to display selectable device objects corresponding to the matched devices returned in the search result, and (ii) a floormap display portion to display, in response to user selection of one of the selectable device objects, a floormap associated with the selected device object. In addition, the matched device corresponding to the selected device object may be highlighted or centered on the displayed floormap.

In another aspect, the list of matched devices may be cached or captured in a search result store, and when the floormap interface removes the device listing display portion from display, the list of matched devices remains captured in the search result store. When the search interface performs another search, based on another set of user-specified search terms, the search interface causes search results based on such other set of user-specified search terms to be also captured in the search result store while the previous list of matched devices remains captured in the search result store. Further, each of (i) the previous list of matched devices and (ii) the search results based on the other set of user-specified search terms can be selectable by the user for display in the device listing display portion.

In another aspect, the device search terms can be captured along with the corresponding list of matched devices in the search result store, and likewise, the other (later entered) set of user-specified search terms can be captured along with the search results based on such other set of user-specified search terms in the search result store. When the list of matched devices is selected for display again in the device listing display portion, the search interface may perform the search once again, based on the corresponding device search terms, to update the list of matched devices, and updated device objects corresponding to the updated list of matched devices are displayed in the device listing display portion.

In another aspect, the device search terms, corresponding to the list of matched devices, can be captured in a search archive store, and when the search interface is once again activated for performing another search, the device search terms captured in the search archive store is automatically retrieved from the search archive store and presented for selection, or editing, for such other search.

In another aspect, to make it easier for the user to locate a device that is not apparent from the displayed map, the application user interface provides a search object which is user selectable to cause the search interface to be activated and displayed for user entry of search terms while the floormap is displayed. The application user interface including the search object may also be displayed while the device listing display portion is displayed.

In another aspect, in a case that a device object corresponding to another matched device in the device listing display portion is selected while the floormap is displayed in the floormap display portion, and such other matched device is not in the displayed floormap but is in another floormap registered by said floormap interface, the displayed floormap is replaced, in the floormap display portion, by said another floormap retrieved from said floormap interface. The floormap displayed in response to the user selection of the device object may be superposed over, at least a part of, the device listing display portion.

In another aspect, when an unplaced device object selected from the device listing display portion has no associated location information, a device placement user interface including a list of unplaced devices, having no floormaps associated with the unplaced devices, may be displayed along with a list of floormaps. When a floormap on the list is selected, the selected floormap is displayed in the floormap display portion, and the device placement user interface allows the user to place, by drag-and-drop, a device object, selected from the list of unplaced devices, onto a specified location on the displayed floormap.

Many other features, as discussed infra, can be provided to optimize use of digital maps.

BRIEF DESCRIPTION OF THE DRAWINGS

The aforementioned and other aspects, features and advantages can be more readily understood from the following detailed description with reference to the accompanying drawings wherein:

FIGS. 7A-7H show examples of user interface screens provided by the application, according to an exemplary embodiment;

FIG. 12 shows a table containing examples of additional information that can inserted in a comment box, according to an exemplary embodiment.

DETAILED DESCRIPTION

Figure 1:
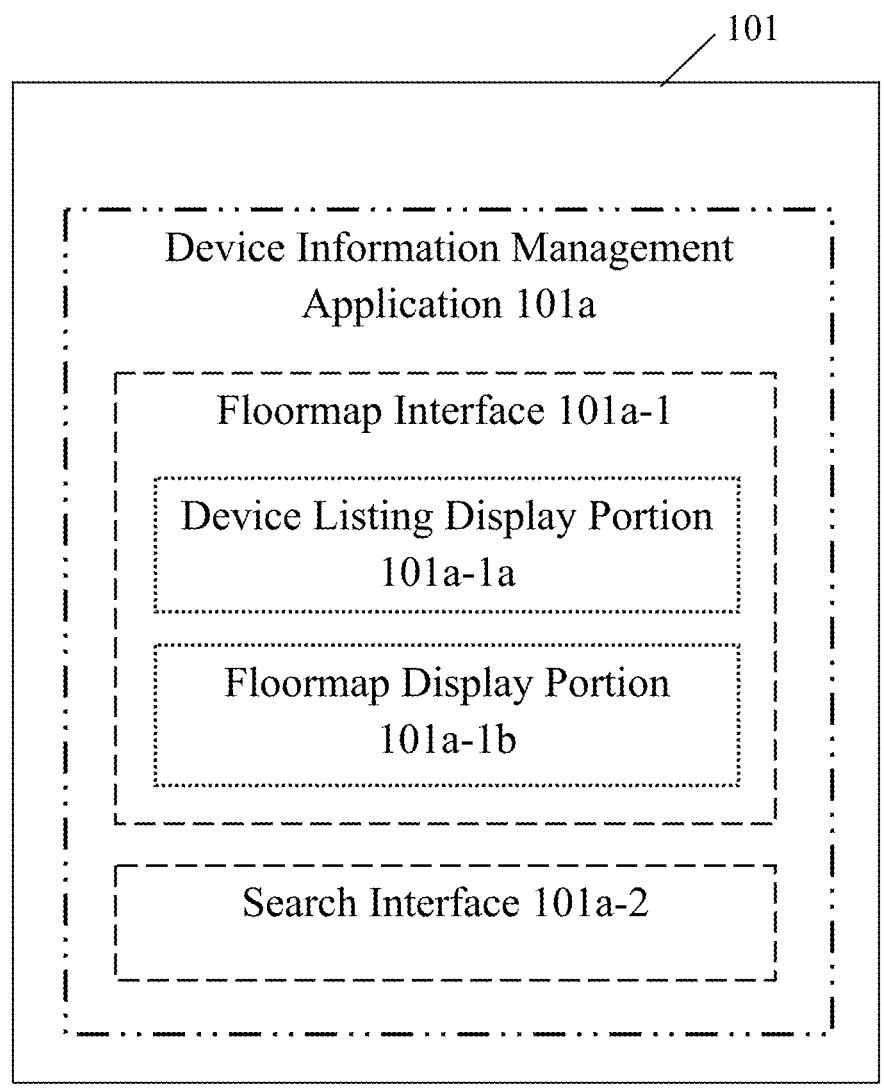
FIG. 1 shows a block diagram of an application that can be provided on or to a terminal, to permit the user of the terminal to locate devices based on specified device information, with aid of maps, according to an exemplary embodiment.

In describing preferred embodiments illustrated in the drawings, specific terminology is employed for the sake of clarity. However, this disclosure is not intended to be limited to the specific terminology so selected and it is to be understood that each specific element includes all technical equivalents that operate in a similar manner. In addition, a detailed description of known functions and configurations is omitted when it may obscure the inventive subject matter. Referring now to the drawings, wherein like reference numerals designate identical or corresponding parts throughout the several views, there are described tools (e.g., systems, apparatuses, methodologies, computer program products, etc.) for locating, as an example, devices, with aid of digital maps.

FIG. 1 shows schematically a block diagram of a device information management application 101*a* provided on or to a terminal 101 and including a floormap interface 101*a*-1 and a search interface 101*a*-2

The terminal 101 can be any computing device, including but not limited to a personal, notebook or workstation computer, a kiosk, a PDA (personal digital assistant), a mobile phone or handset, another information terminal, etc., that can communicate with other devices through the network 104. The terminal 101 is further described infra with reference to FIG. 4.

The device information management application 101*a* may be provided on or to the terminal 101 to allow the user to search, on demand, for devices, with aid of digital maps. Such application may be a native program installed on the terminal 101, or may be provided from an external source as an application and/or as part of a platform, or may be provided as a service (e.g., software as a service, i.e. SaaS).

The floormap interface 101*a*-1 register a floor plan of a floor of a building (floor map), and can be configured to allow the user to place (such as by drag and drop) device objects onto the floor map and add annotations or comments for each placed device. The floormap interface 101*a*-1 includes a device listing display portion 101*a*-1*a* and a floormap display portion 101*a*-1*b*.

The search interface 101*a*-2 facilitates the searching of devices. The search interface 101*a*-2 is configured to permit user entry of device search terms. Such device search terms may include, but are not limited, name/identifier (e.g., device name, walkthrough ID, Asset tag, etc.), device type (e.g., printer, MFP, scanner, etc.), device functions (e.g., black & white, duplex, fax, scanning, N-up, etc.), physical location, network address (e.g., IP address, MAC address, etc.), device technology (e.g., laser, inkjet solid ink, thermal, other technology, etc.), supply level (e.g., level of consumable, such as paper and toner, is empty, low, ok, etc.), pages per job (e.g., 1, 2, 6-10, etc.), color technology (e.g., professional color, convenience color, etc), device properties (e.g., manufacturer, model, serial number, etc), etc. The search interface 101*a*-2 attempts to match the device search terms with the data of each device placed on the floormaps of the buildings. For every registered device in which device data matches the device search terms, the search interface 101*a*-2 places the device on the list. When the search is finished, the search interface 101*a*-2 returns the list of matched devices.

The device listing display portion 101*a*-1*a* displays the list returned by the search interface 101*a*-2. As discussed, the list includes all of the devices that match the device search terms. In addition, the device listing display portion 101*a*-1*a* may also display other information regarding the device as well. For example, the user may be presented with information regarding device name or identifier (e.g., device name, walkthrough ID, Asset tag, etc.), device type (e.g., printer, MFP, scanner, etc.), device functions (e.g., black & white, duplex, fax, scanning, N-up, etc.), physical location, network address (e.g., IP address, MAC address, etc.), device technology (e.g., laser, inkjet solid ink, thermal, other technology, etc.), supply level (e.g., level of consumable, such as paper and toner, is empty, low, ok, etc.), pages per job (e.g., 1, 2, 6-10, etc.), color technology (e.g., professional color, convenience color, etc), device properties (e.g., manufacturer, model, serial number, etc), etc.

The floormap display portion 101*a*-1 displays a floormap which may be any type of two-dimensional visual representation of an area. Icons may be placed on the floormap to represent objects such as chairs, desks, bookshelves, cabinets, doors, stages, tables, sofas, etc., in addition to graphical indications of walls, other dividers, windows, etc. In addition, icons representing printers, scanners, multifunctional printers (MFP), other devices, may be placed on the map as well. Further, conventional options such as zooming, panning, scrolling, etc., may be provided by the floormap display portion 101*a*-1 as well. The floormap may be displayed after the user selects a device on the device listing display portion 101*a*-1*a*. For example, the floormap display portion 101*a*-1 determines the floor on which the device is located, using the data registered for the device, and displays the floormap of such floor.

Figure 2A:
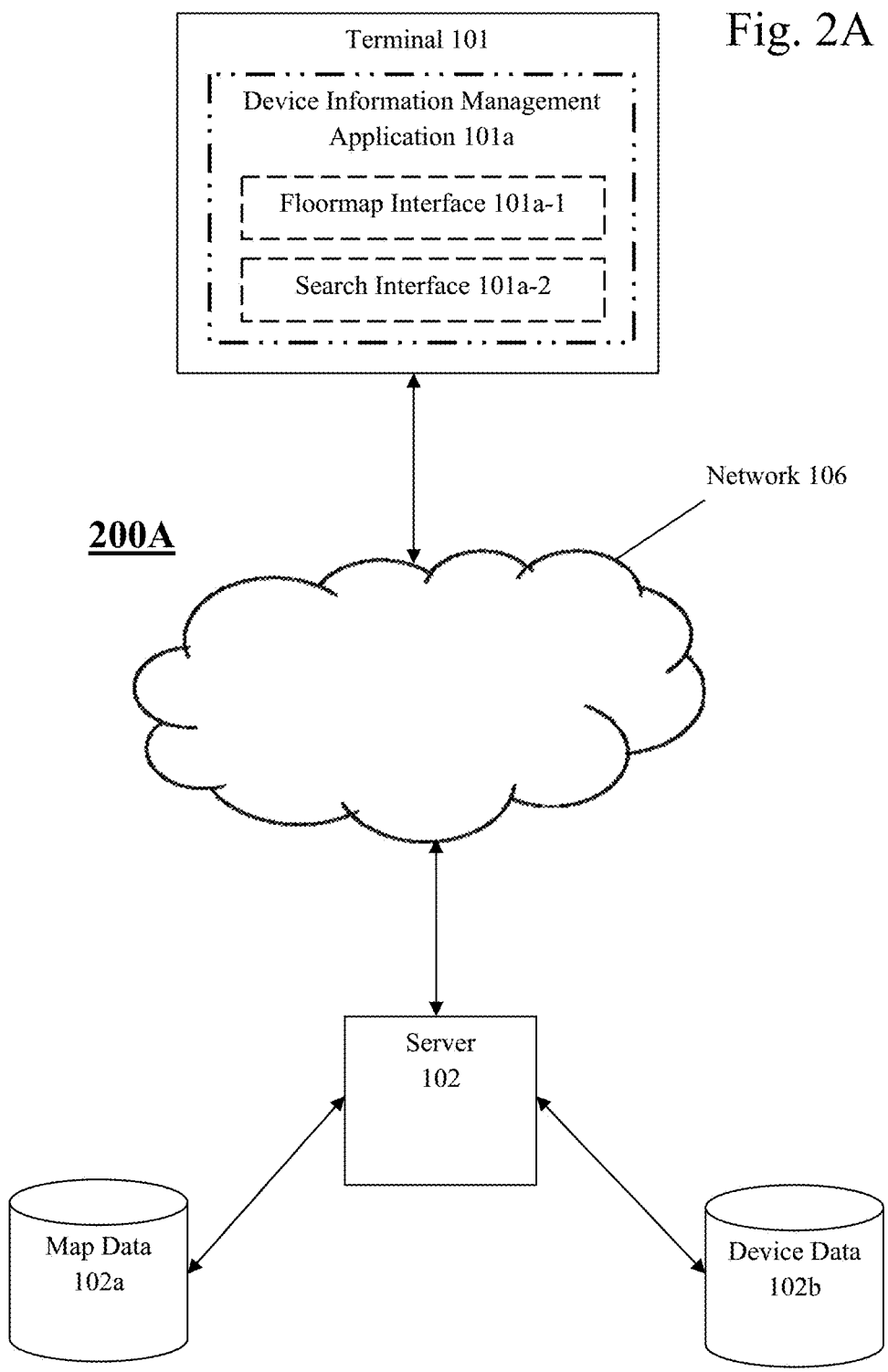
FIG. 2A shows a block diagram of a system in which an application can be provided to a terminal to enable the user to locate devices based on specified device information, with aid of maps, according to an exemplary embodiment.

FIG. 2A shows schematically a system 200A that includes a terminal 101 and a server 102, all of which are interconnected by network 106. Although only one terminal is shown in FIG. 2A, it should be understood that the system 200A can include a plurality of user terminal devices (which can have similar or different configurations).

The server 102 is connected to network 106, and may provide the device information management application 101a, on demand, to a requesting device, such as terminal 101. In such instance, the device information management application 101a is not pre-installed on the terminal 101 and is instead downloaded, or provided as a service, to the terminal 101 from another location (e.g., the server 102). Thus, in the case in which the user wishes to access the device information management application 101a, the terminal 101 may send a request to the server 102. In response to such request, the server 102 may provide the device information management application 101a to the terminal 101. However, before sending the software the server 102 may check user credentials. If the user has authorization to access the features of the device information management application 101a, the server 102 provides the device information management application 101a to the terminal 101. Otherwise, the device information management application 101a is not provided to the terminal 101.

In an exemplary embodiment, the server 102 may also be used to access information regarding maps and devices which are stored in the map database 102a and device database 102b, respectively. For example, the map database 102a may store maps of buildings and the corresponding floor plans for each floor of the building. There may be multiple building data stored in the map database 102a. Further, the maps stored may be in a variety of formats such as PDF, GIF, JPEG, Bitmap, PNG, etc. On the other hand, the device database 102b stores information regarding devices such as printers, MFPs, scanners, etc. This information may include name or identifier (e.g., device name, walkthrough ID, Asset tag, etc.), device type (e.g., printer, MFP, scanner, etc.), device functions (e.g., black & white, duplex, fax, scanning, N-up, etc.), physical location, network address (e.g., IP address, MAC address, etc.), output technology (e.g., laser, inkjet solid ink, thermal, other technology, etc.), supply level (e.g., level of consumable, such as paper and toner, is empty, low, ok, etc.), pages per job (e.g., 1, 2, 6-10, etc.), color technology (e.g., professional color, convenience color, etc), device properties (e.g., manufacturer, model, serial number, etc), etc., of each of the devices. It should be noted that the device information stored in the device database 102b is not required to contain device information of devices connected to network 106 only. It may contain device information of devices that are not connected to network 106 as well. The user may access the server 102 to obtain information regarding maps and devices without having to manually input the information, thereby making it more convenient for the use. The server 102 is further described infra with reference to FIG. 3.

The network 106 can be a local area network, a wide area network or any type of network such as an intranet, an extranet (for example, to provide controlled access to external users, for example through the Internet), a private or public cloud network, the Internet, etc., or a combination thereof. Further, other communications links (such as a virtual private network, a wireless link, etc.) may be used as well for the network 106. In addition, the network 106 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

Figure 2B:
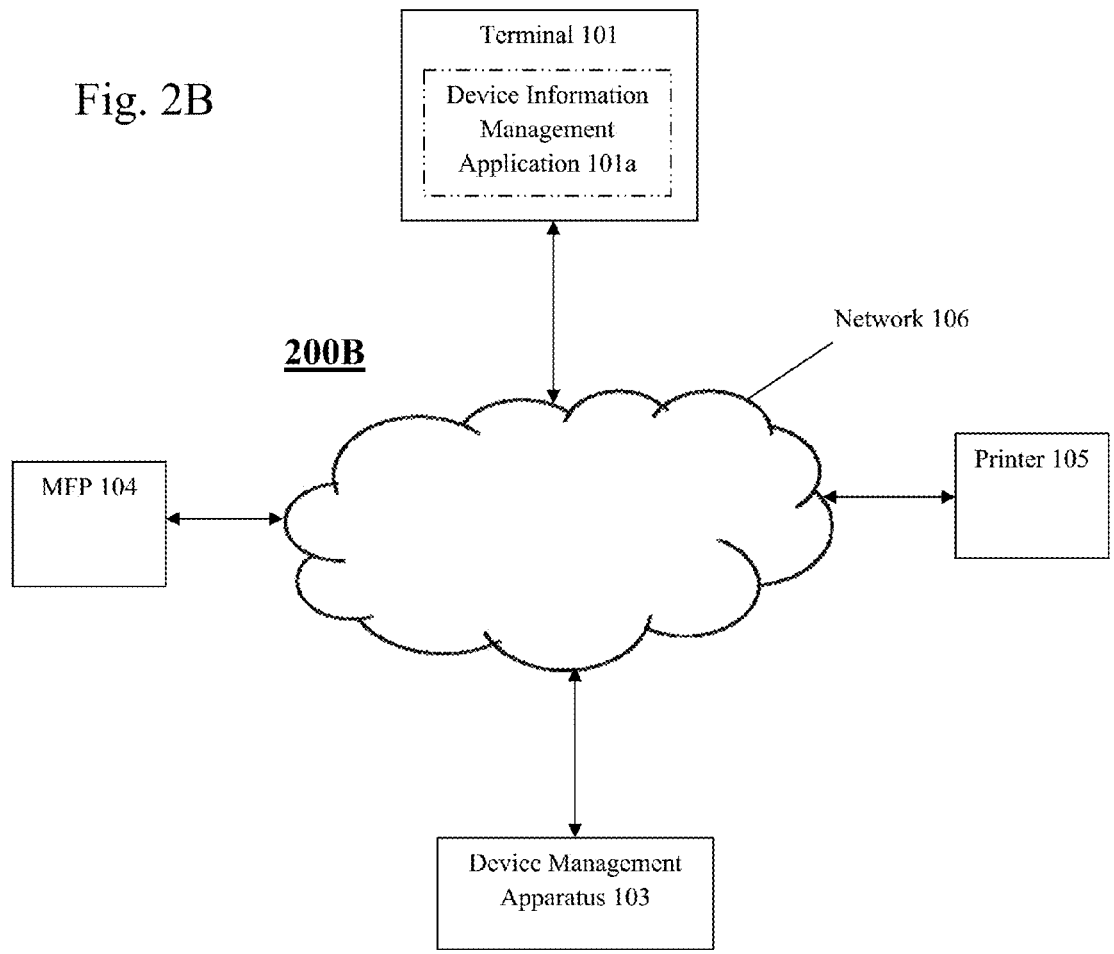
FIG. 2B shows a block diagram of a system in which an application is provided on or to a terminal to enable the user to locate devices based on specified device information, with aid of maps, according to another exemplary embodiment.

FIG. 2B shows schematically a system 200B, according to another exemplary embodiment. The system 200B is similar to the system 200A of FIG. 2A except that the system additionally includes a device management apparatus 103, MFP 104 and a printer 105.

The terms "printer" and "printer device" are used hereinafter generically to include any output device having a printing or plotting functionality, and include multifunction devices having a copy and/or scanning functionality in addition to the printing or plotting functionality.

The device management apparatus 103 collects data from a plurality of devices throughout the network 106. For example, the device management apparatus 106 may store information regarding the MFP 104 and/or the printer 105. This information may include name or identifier (e.g., device name, walkthrough ID, Asset tag, etc.), device type (e.g., printer, MFP, scanner, etc.), device functions (e.g., black & white, duplex, fax, scanning, N-up, etc.), physical location, network address (e.g., IP address, MAC address, etc.), output technology (e.g., laser, inkjet solid ink, thermal, other technology, etc.) supply level (e.g., level of consumable, such as paper and toner, is empty, low, ok, etc.), pages per job (e.g., 1, 2, 6-10, etc.), color technology (e.g., professional color, convenience color, etc), device properties (e.g., manufacturer, model, serial number, etc), etc. The device management apparatus 103 may send this information to the terminal 101 when requested. Consequently, the user can easily obtain information regarding devices connected to network 106 without having to manually input the information, thereby making it more convenient for the use. The device management apparatus 103 is further described infra with reference to FIG. 3.

Figure 5:
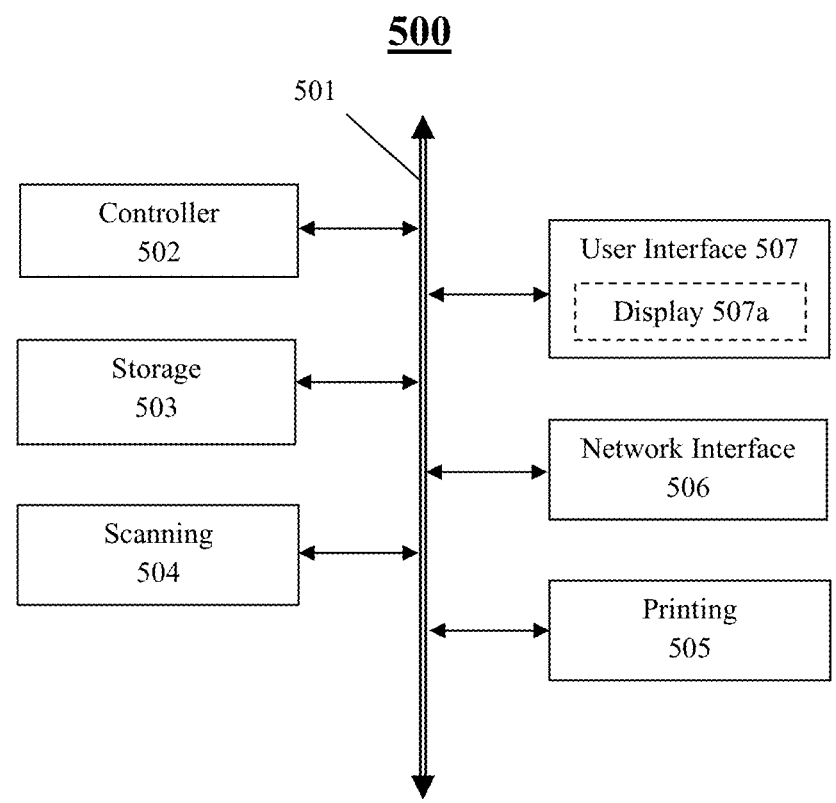
FIG. 5 shows a block diagram of an exemplary configuration of a multi-function device.

The MFP 104 can be, for example a printer/scanner, printer/scanner/fax, etc. While this example of this disclosure simply refers to a single MFP 104 and a single printer 105 in the interest of brevity, it should be appreciated that the network environment can have an arbitrary number of MFP and printer devices. The MFP 104 may be configured as shown in FIG. 5, which is discussed infra.

Otherwise, operations of the elements of the system 200B are similar to those discussed in connection with the corresponding elements of the system 200A of FIG. 2A.

Figure 3:
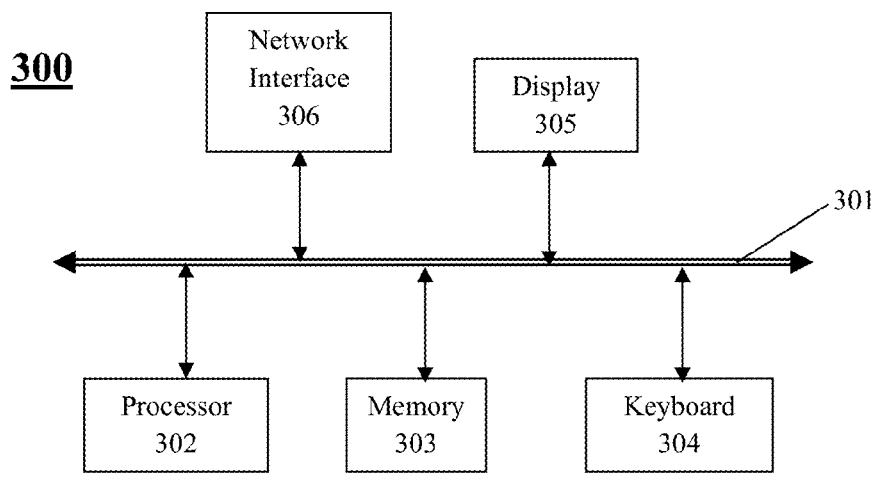
FIG. 3 shows a block diagram of an exemplary configuration of a computing device.

FIG. 3 shows an exemplary constitution of a computer 200 that can be configured (for example, through software) to operate (at least in part) as the server 102 of FIG. 2A, or the device management apparatus 103 of FIG. 2B. As shown in FIG. 3, the management unit 300 includes a controller (or central processing unit) 202 that communicates with a number of other components, including a memory or storage part 303, keyboard 304, display 305 and network interface 306, by way of a system bus 301. The computing device 300 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

Additional aspects or components of the computing device 300 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 4:
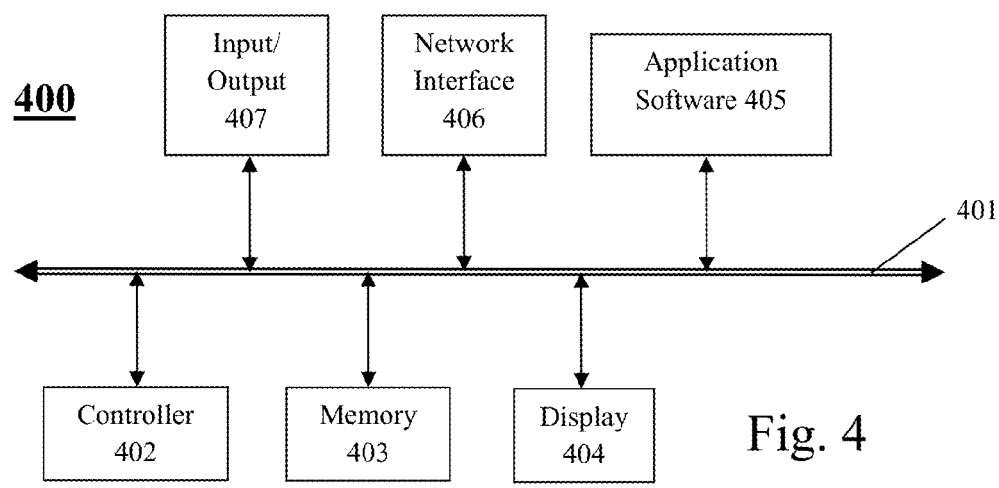
FIG. 4 shows a block diagram of an exemplary configuration of a terminal.

FIG. 4 shows an exemplary constitution of the terminal 101 of FIGS. 2A and 2B (for example, as a computer). In FIG. 4, a computer 300 includes a controller (or central processing unit) 402 that communicates with a number of other components, including memory 403, display 404, application software 405, network interface 406 and input/output (such as mouse, keyboard, touchpad, stylus, microphone and/or speaker with voice/speech interface and/or recognition software, etc.) 407, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 406 provides a connection (for example, by way of an Ethernet connection or other network connection which supports any desired network protocol such as, but not limited to TCP/IP, IPX, IPX/SPX, or Net-BEUI) to the network to which the computer 400 is connected (e.g., network 106 of FIGS. 2A and 2B).

The application software 405 is shown as a component connected to the internal bus 401, but in practice are typically stored in storage media such as a hard disk or portable media, and/or received through the network, and loaded into memory 403 as the need arises.

Additional aspects or components of the computer 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 5 shows a schematic diagram of a configuration of a printing device as an MFP (multi-function printer or multi-function peripheral), which can be any apparatus (including a microprocessor chip or a collection of devices having varying degree of integration) that has the ability to perform two or more functionalities.

The MFP 500 shown in FIG. 5 includes a controller 502, and various elements connected to the controller 502 by an internal bus 501. The controller 502 controls and monitors operations of the MFP 500. The elements connected to the controller 502 include storage 503 (for example, random access memory, read-only memory, hard disk drive, portable storage media drive such as for optical discs, magnetic discs, magneto optical discs, etc., semiconductor memory cards, combinations of storage media, etc.), scanning 504, printing 505, a network interface (I/F) 506 and a user interface 507.

Storage 503 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 503 and executed by the controller 502 to carry out the instructions. Such instructions can include instructions for performing specified functions (such as printing, scanning, faxing, copying, e-mailing, etc.) of the MFP 500, to enable the MFP 500 to interact with a terminal, as well as perhaps other external devices, through the network interface 506, and interactions with users through the user interface 507.

The network interface 506 is utilized by the MFP 500 to communicate with other network-connected devices such as a terminal or a device management apparatus (e.g., the device management apparatus 103 of FIG. 2B) and receive data requests, print jobs, user interfaces, and etc.

The user interface 507 includes one or more electronic visual displays that display, under control of controller 502, information allowing the user of the MFP 500 to interact with the MFP 500. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 500, so as to allow the operator to interact conveniently with services provided on the MFP 500, or with the MFP 500 serving as terminal for accessing electronic data or other content through the network. User interfaces or other contents received through the network via the network interface 506 can be displayed on the display screen.

The display screen does not need to be integral with, or embedded in, a housing of the MFD 500, but may simply be coupled to the MFD 500 by either a wired or a wireless connection. The I/O 507 may include keys and/or buttons (such as graphical keys or buttons, or other graphical elements, of a GUI on a touchscreen display) for inputting information or requesting various operations. Alternatively, the I/O 507 and the display screen 507a may be operated by a keyboard, a mouse, a remote control, voice recognition, or eye-movement tracking, or a combination thereof.

Scanning 504, printing 505, and network interface 506 are otherwise conventional, and therefore, a detailed description of such conventional aspects is omitted in the interest of clarity and brevity.

The MFP 500 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

Figure 6:
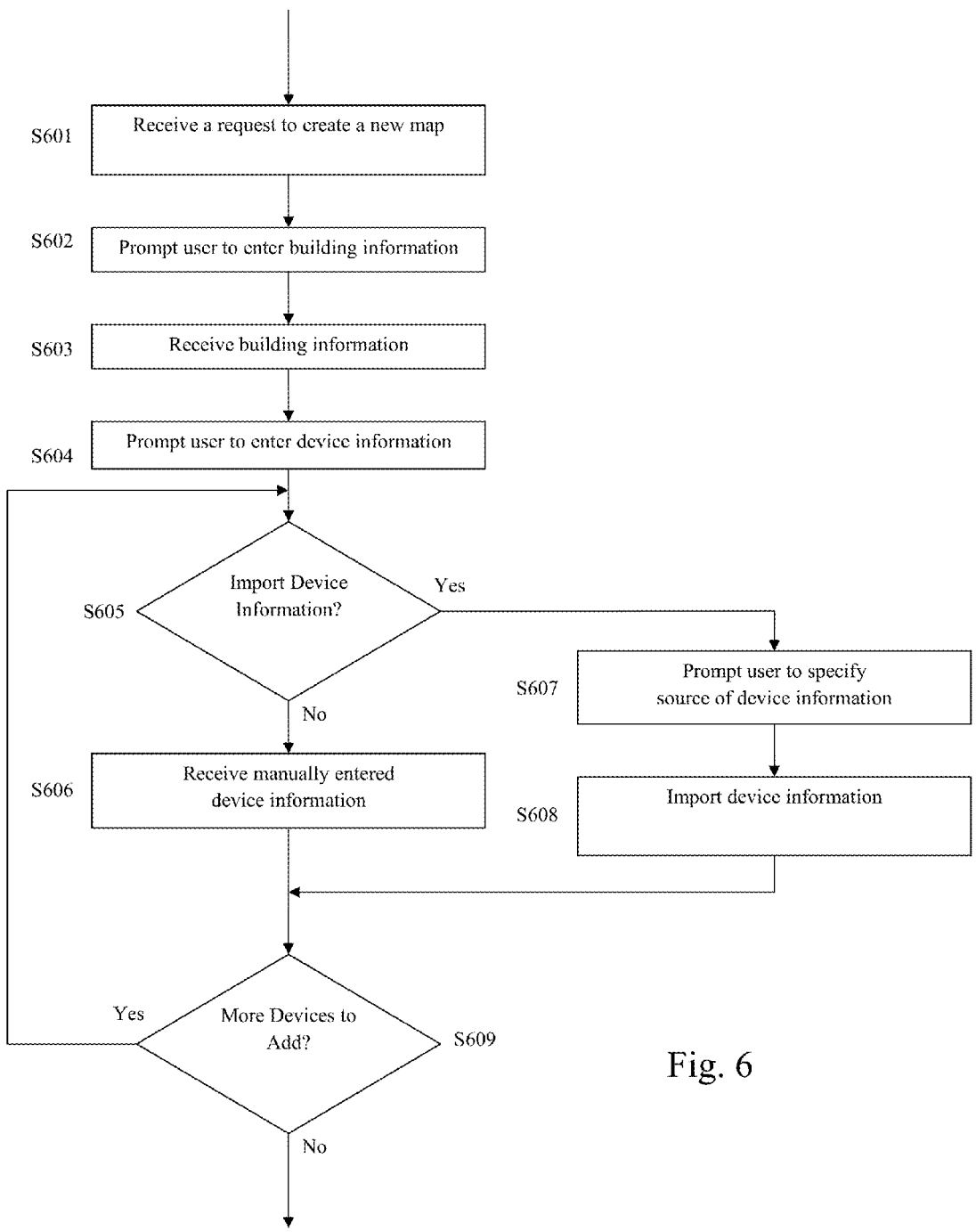
FIG. 6 shows a flow chart of a method performed by the application shown in FIG. 1, according to an exemplary embodiment.

FIG. 6 shows a process performed by a terminal (e.g., 101), for adding a map and associating devices with the map, according to an exemplary embodiment.

Figure 7A:
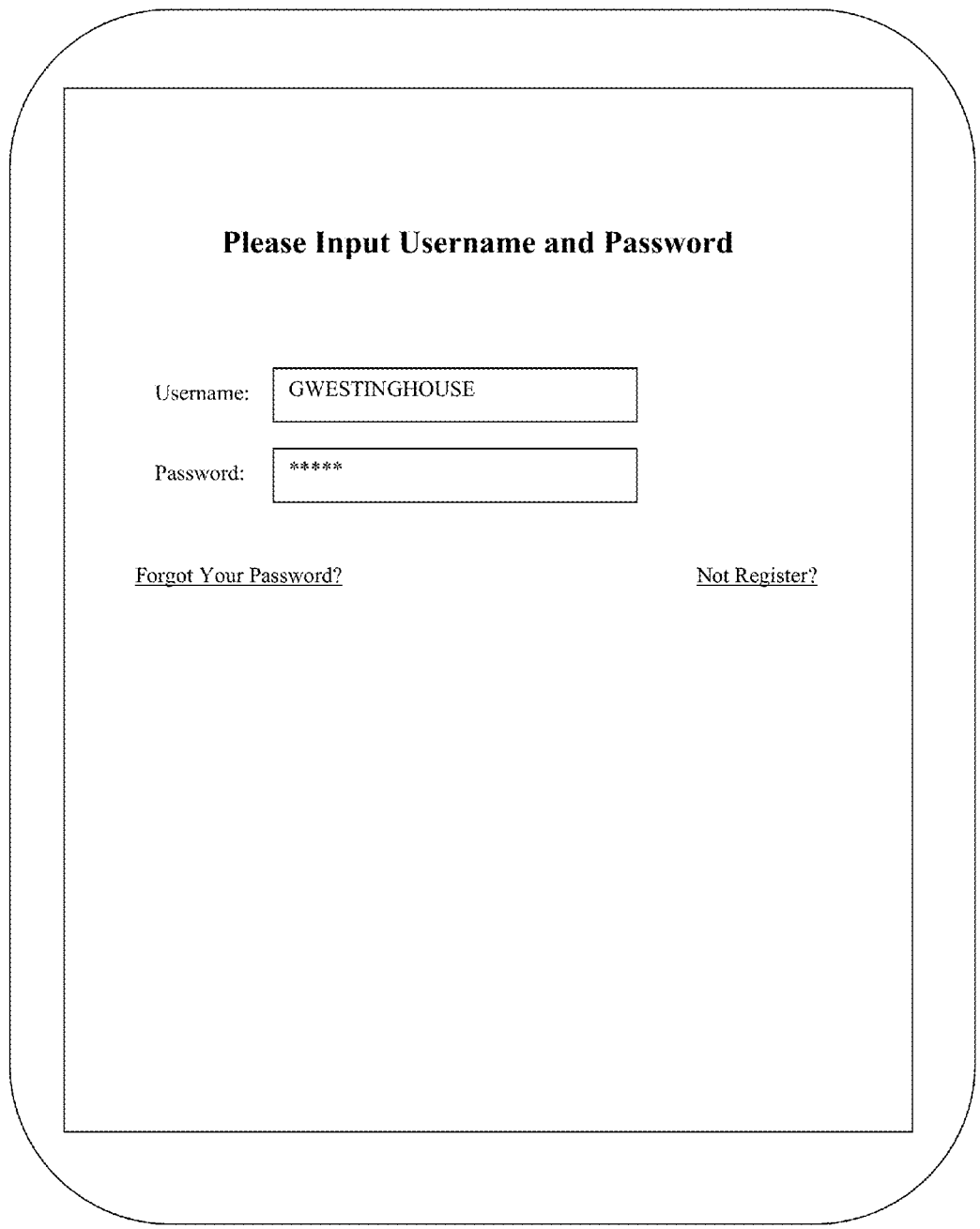
Figure 7B:
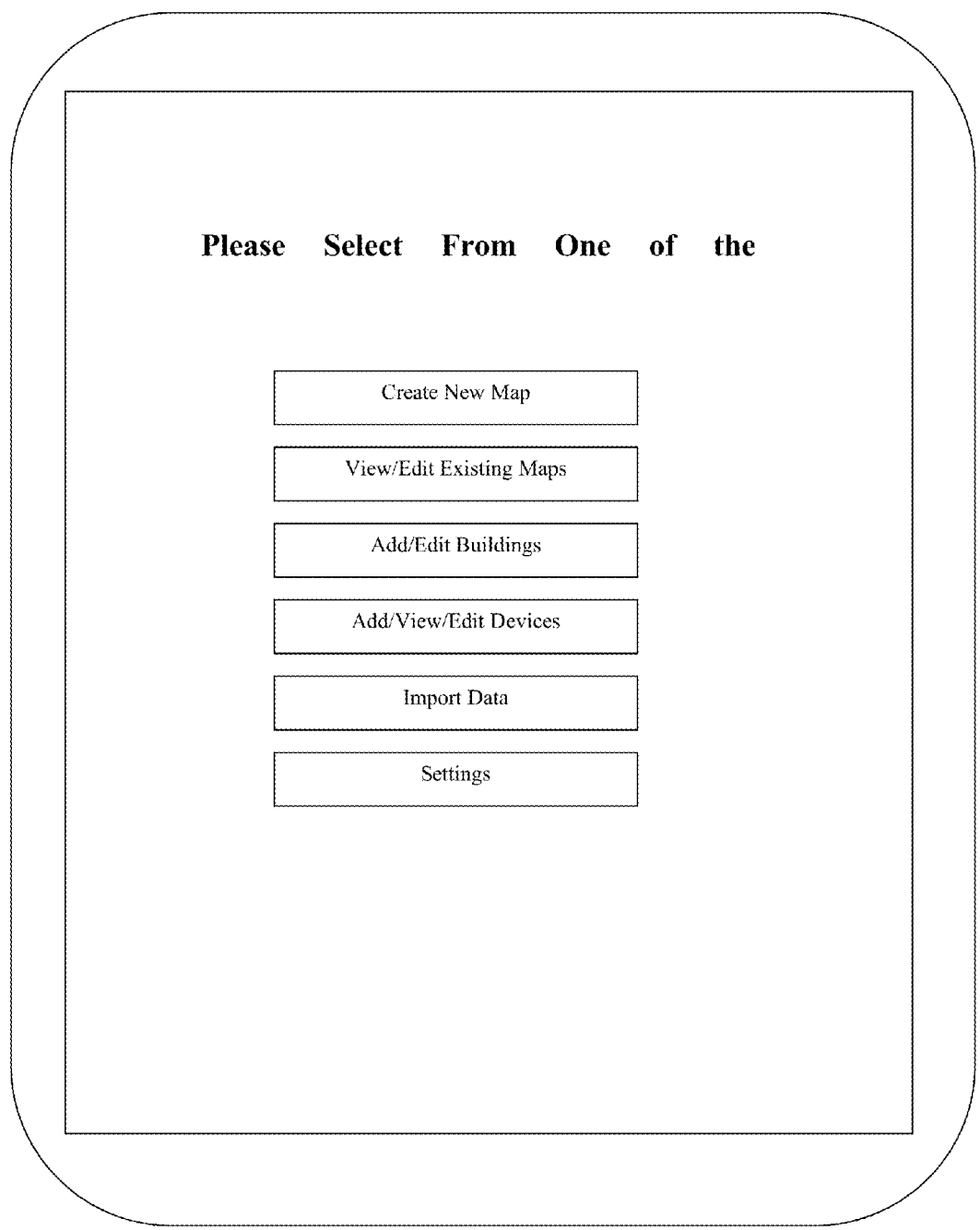
Figure 7D:

When a user wants to create a map, the user may login to the application 101a, as shown in FIG. 7A. Next, the user may have various options, such as, for example, "Create New Map", "View/Edit Existing Maps", "Add/Edit Buildings", "Add/View/Edit Devices", "Import Data" and "Settings", as illustrated in FIG. 7B.

The user may create a map by pressing the "Create New Map" button (step S601). Next, the application 101a prompts the user to enter information regarding the building containing the floor that the user wishes to map (step S602) as illustrated in FIG. 7C. As shown, there are multiple steps to the process in which user is to enter building information (step S603). In the initial stage, the user is prompted to enter information for "Building Properties" which includes the name of the building and its street address. After entering the information, which in this case is "New Office" for building name and "18-86 Invention St. Pittsburgh, Pa. 30023" for Street Address, the user may press the "Next Step" button to continue entering more information. In the next step which is "Define Floors", the user is prompted to select the number of floors in the building and a name for identifying each floor. As shown the user has entered "3" for the number of floors in the building. Further, the user has assigned the name for floor "1" as "Ground", floor "2" as "Cafeteria/Theatre" and floor "3" as Offices. It should be noted that the numbers "1", "2" and "3" denote the physical floors of each building. In other words, "1" designates the lowest floor while in this case, "3" denotes the highest floor.

After performing this task, the user once again presses the "Next Step" button to advance to a third step which is "Define Workgroups" and, in this case, is the final step. Here, the user enters information regarding workgroups which are structures that represents a group of employees within a certain floor. For example, there might be a workgroup for a marketing or prototype division. It should be noted that this is an optional step as the user is not required to enter workgroup information. However, in the case that the user wishes to do so, the user firsts selects a floor in the building, then selects the number of workgroups to be allocated for that floor and then creates an identifier for each of those workgroups. In this case, the user has selected the third floor which is "Offices" and "2" for the number of workgroups. The user has named each of the two workgroups "Engineers" and "Managers". After completing the building information the user may perform editing by pressing the "Edit" button for each section to perform edits in the case of an errors. The user may further add more buildings to be registered by pressing the "Add More" button as well. Once the user is finished, the user may proceed to the next step by pressing the "Next" button.

Figure 7G:
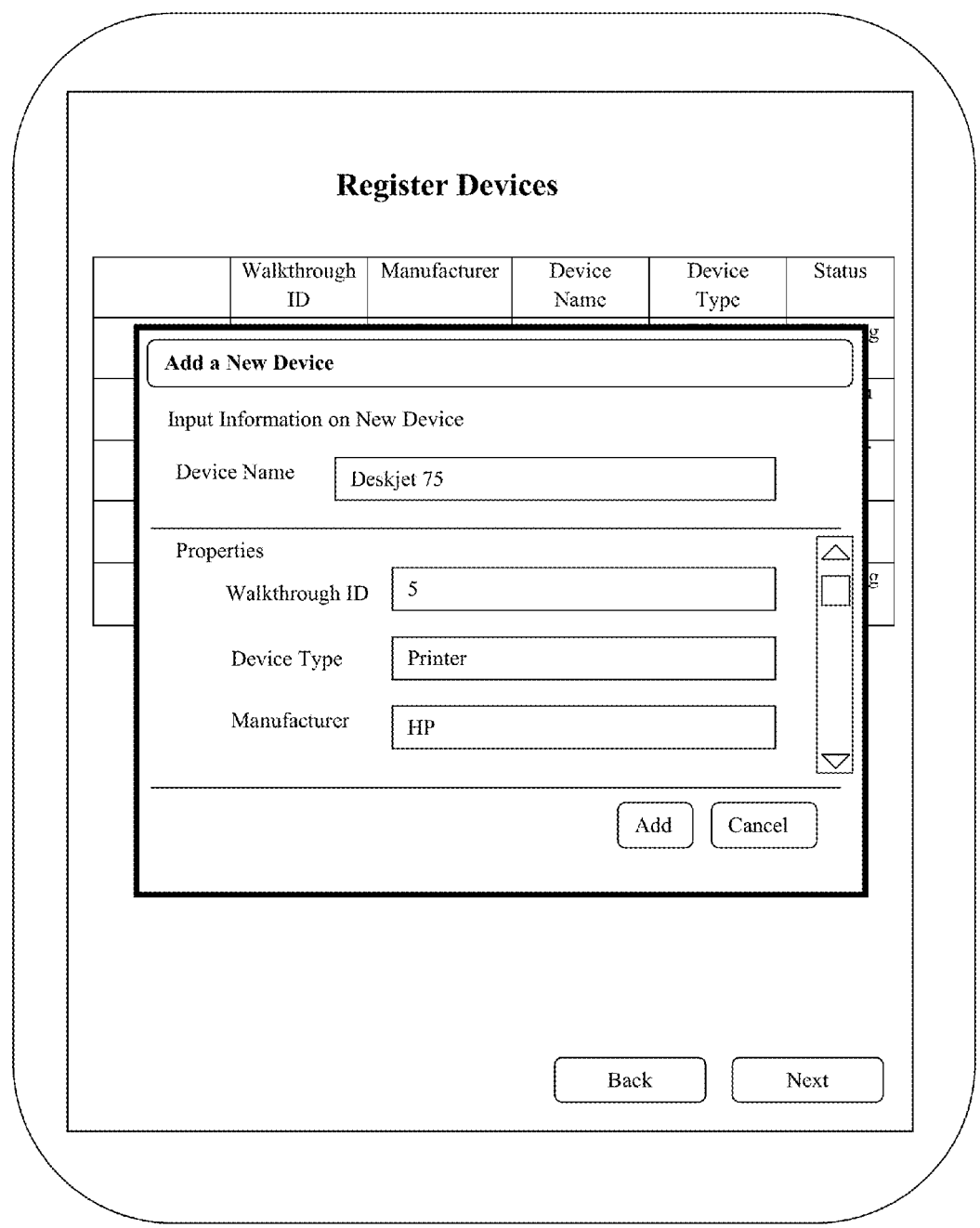

The application 101a may then prompt the user to enter device information (step S604), as shown in FIG. 7F. Since the user may be adding comments for devices that are on each floor of the building, the user may proceed to input information relating to each device. As illustrated, the user has several options from which to select. In addition, the user also has the option of manually adding device information or importing device information from an external source. For example, in the case that the user decides to manually add device information (step S605, No) instead of importing device information, the user may press the "add" button which causes the application 101a presents to the user a screen as shown in FIG. 7G. In this screen, the user can manually input information without the requirement to select pre-selected options. As a result, the user may input any type of characters for the "Device Name", "Walkthrough ID", "Device Type" and "Manufacturer" categories. It should be noted that the user is not required to enter all of the information for each category. The user may simply enter only information for the "Device Name" category. After the user has finished with inputting the device information (step S606), it is added to the list (such as shown in FIG. 7F).

Figure 7H:
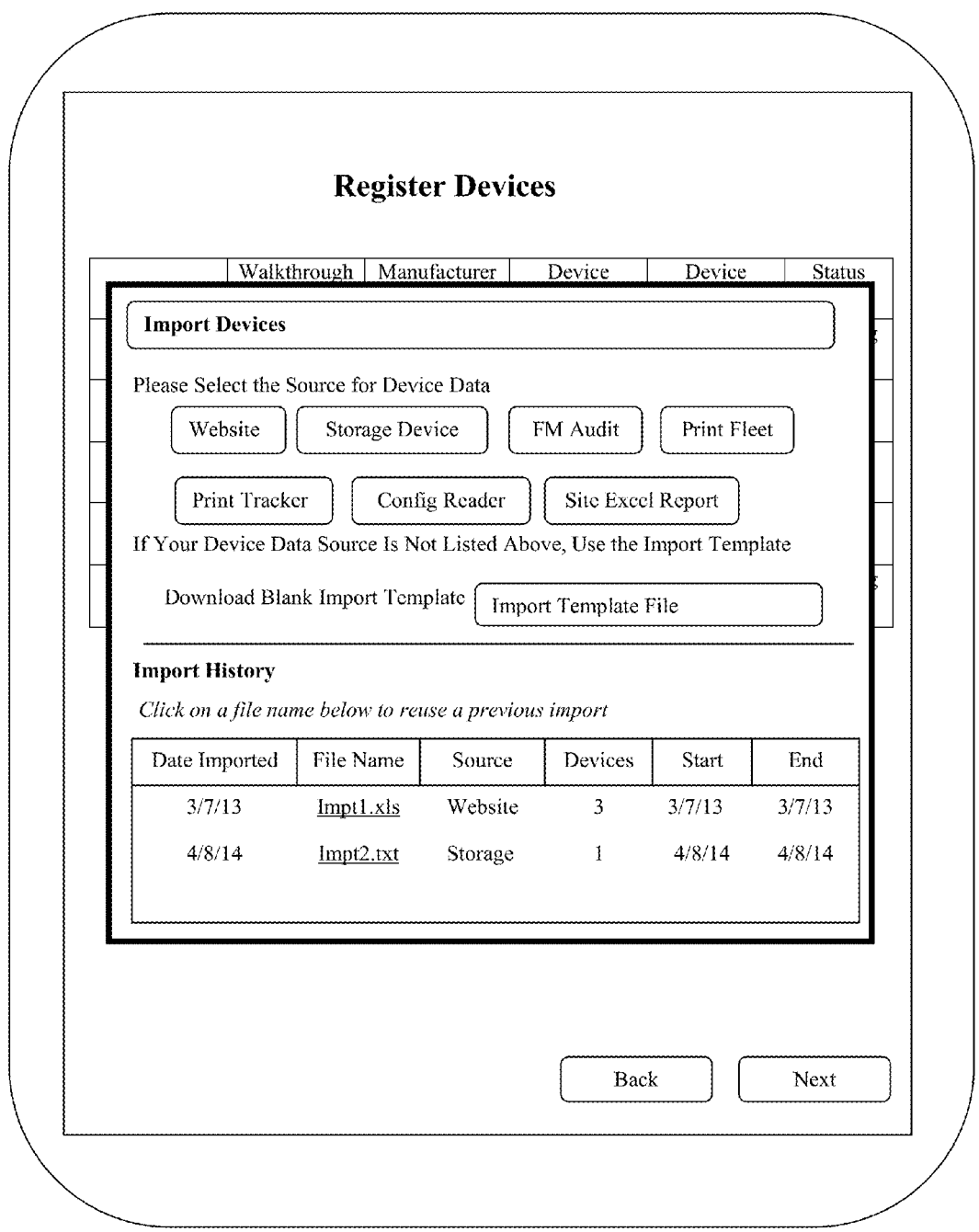

On the other hand, in the case that the user selects to import device information (step S605, yes), the application 101a presents to the user a screen as illustrated in FIG. 7H to prompt the user to select a source to import the device information from (step S607). As shown, the user may select from a variety of sources. For example, the user may download it from a certain website or may instead procure it from a storage device that can be accessed by the application 101a. In addition, in the case that the device source is not listed among the selections, the user can download a blank import template instead to compensate for this. Further, the user may be also presented with his or her import history. For example, information regarding the import history may include but is not limited to the date imported, the file name of the imported file, the source, the number of device information for each device that were imported, the start time of the import and the end time of the import. Moreover, the significance of the import history is that the user may select a file that was imported. Consequently, the user is not required to search for a source of such file. After importing the device information (step S608), the terminal adds the information to the list shown in FIG. 7F. After adding the device information either through manual input or through importing the device data, the user may still have the opportunity to add more device information. In the case that the user decides to do this (step S609, yes) the user may simply press the "add" or "import" buttons. On the other hand, after the user has finished (step S609, no), the user is prompted to proceed to the next step.

In an exemplary embodiment, the user may also perform a search for the devices instead of manually inputting the information or importing data. For example, the terminal 101 may be connected to a network of an organization which has multiple MFPs or printers connected to it as well. The user may perform a search for the devices connected to the network and add them to the list.

Figure 8:
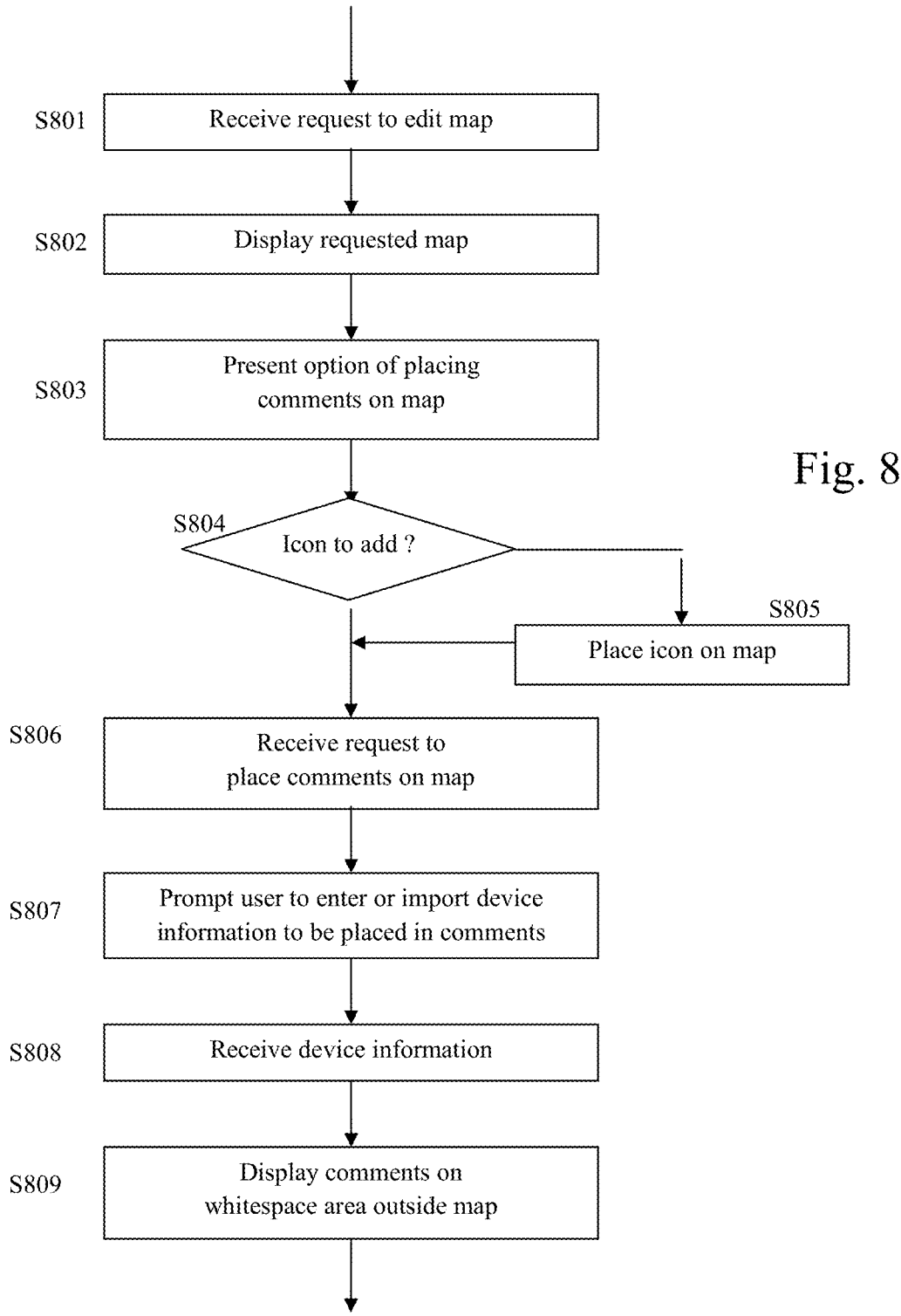
FIG. 8 shows a flow chart of a method performed by the application shown in FIG. 1, according to an exemplary embodiment.

FIG. 8 shows a process performed by a terminal (e.g., 101), for searching for devices, according to an exemplary embodiment.

Figure 9A:
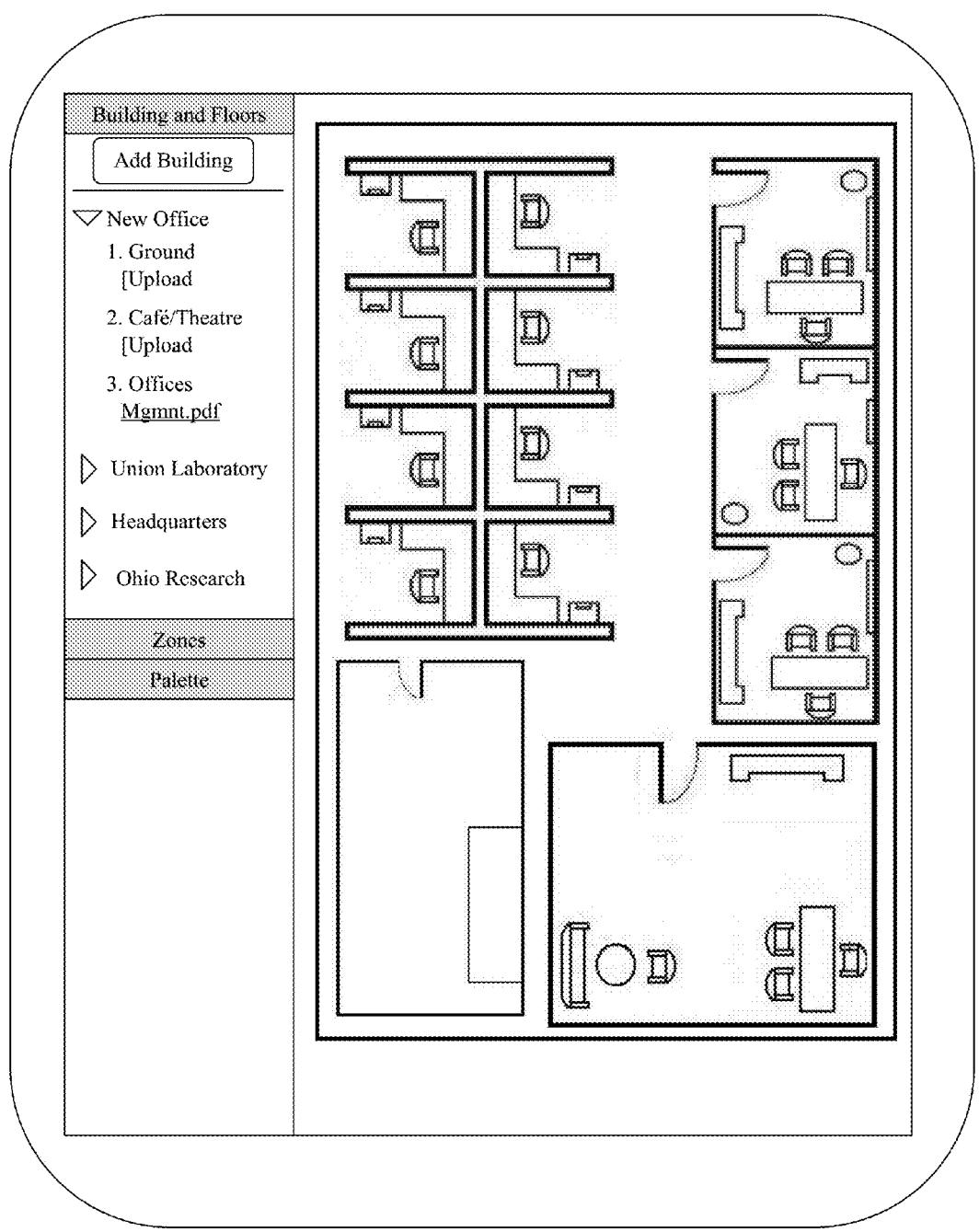
FIGS. 9A-9E show examples of user interface screens provided by the application, according to an exemplary embodiment.

As shown in FIG. 9A, the user can view all of the buildings for which the user has input information. For example, in this case, the user has four buildings which are "New Office", "Union Laboratory", "Headquarters" and "Ohio Research". Further, by expanding the tabs of each building, the user is able to view the floors and their corresponding names that make up the building. In addition, the user is also able to upload floor maps which represent each floor by pressing the "[Upload File]" button for each floor. In this case, the user has uploaded a floor map for the floor "Offices" using the file "Mgmnt.pdf". After uploading the file, the user is shown a preview of the floor map on the right portion of the screen. It should be noted that in this case, the file is a PDF format. However, it may not be limited to this. Other file types such as JPEG, Bitmap, GIF, PNG and etc. may be used instead. After the file has been uploaded, the user may press the floor map to edit it.

Figure 9B:
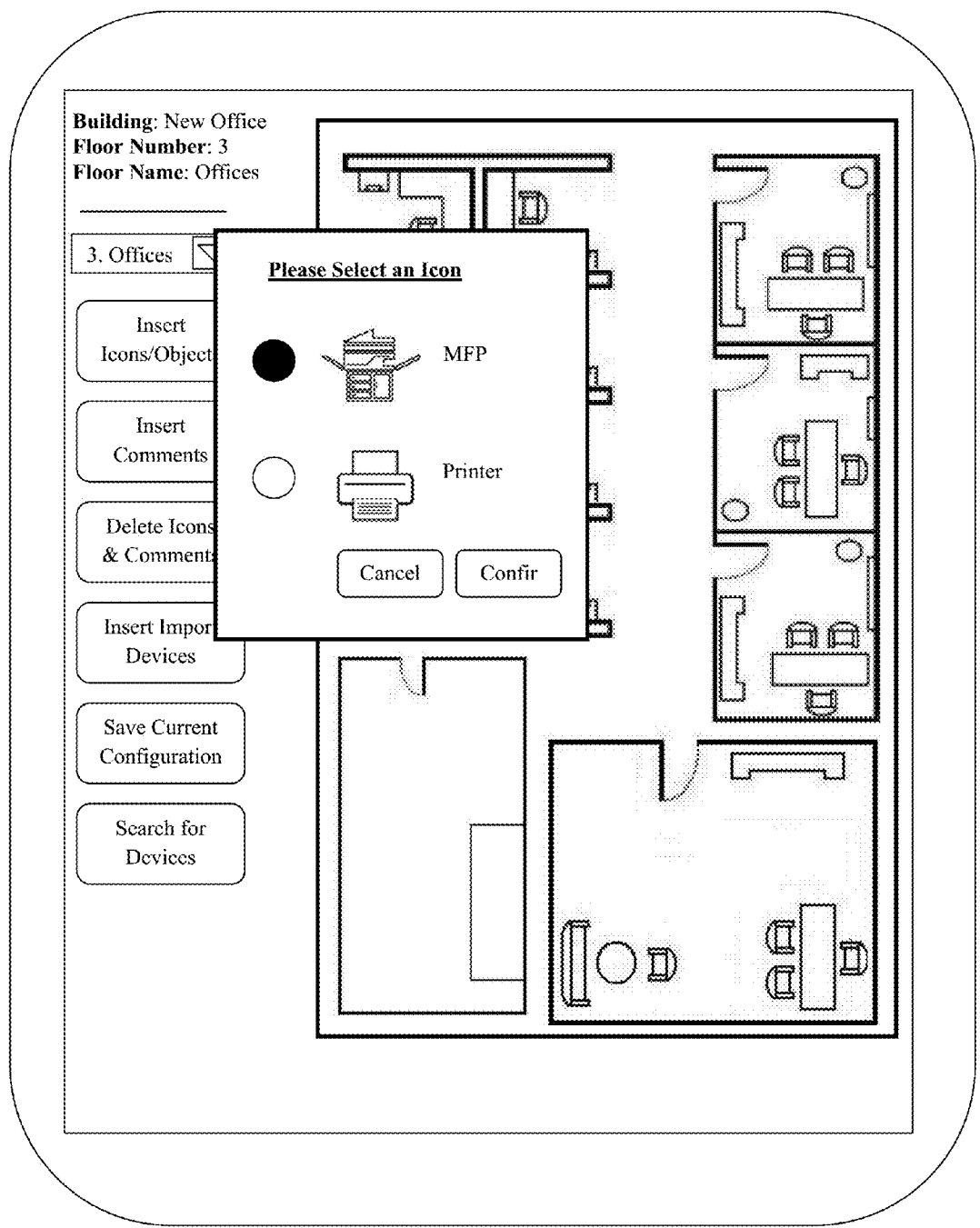

When the application 101a receives a request from the user to edit the floor map (step S801), the user is presented with a screen displaying the floor map (step S802), such as illustrated in FIG. 9A. The floor map displays a typical office space which contains a group of cubicles on the top left of the screen, a group of small offices on the top right of the screen, a large office on the bottom right of the screen and a large empty room on the bottom left of the screen. In addition, the application 101a further presents to the user options for placing icons and comments on the floor map (step S803). Next, the terminal receives a request from the user to place an icon onto the floor map (step S804) and displays a screen to the user as shown in FIG. 9B. The icon may be any representation of any device. In this case, the icon can be either an MFP or a printer. After the user has made the selection by pressing the "confirm" button, the user may place the icon anywhere on the floor map (step S805).

Figure 9C:
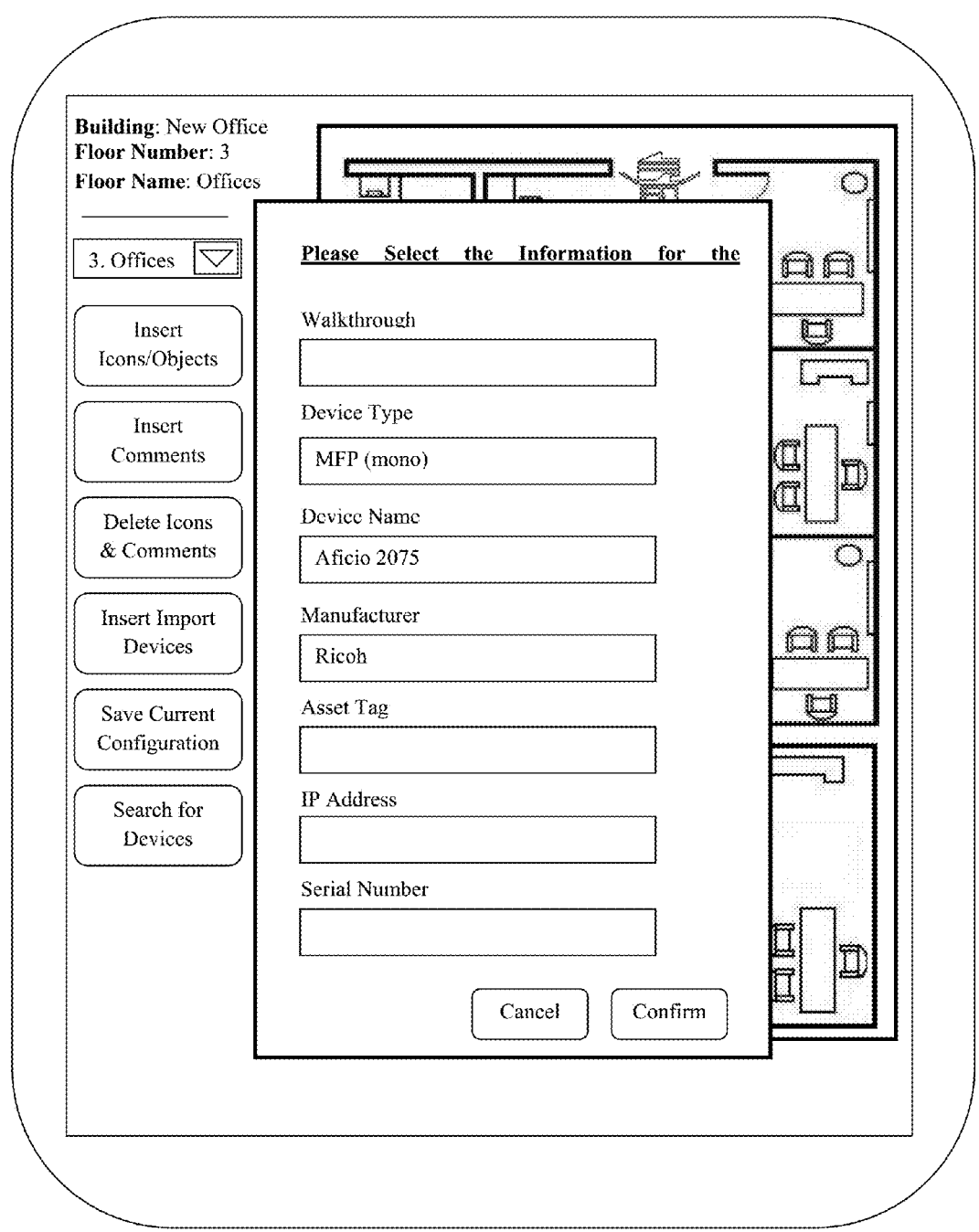

Next, the application 101a receives a request for the user to place comments which correspond to the icon placed on the map (step S806). After receiving the request the application 101a presents a screen to the user as illustrated in FIG. 9C. As shown the user is prompted to enter information regarding the device (step S807) such as "Walkthrough ID", "Device Type", "Device Name", "Manufacturer", "Asset Tag", "IP Address" and "Serial Number". However, these examples should not constitute an exhaustive list of information that the user can enter. A more detailed list, though not exhaustive either, is shown in FIG. 12. Further, it should be noted that the user is not required to enter all of the information in. It is possible that, for whatever reason, the comments may be devoid of any information. After the user has finished inputting the information by pressing the "Confirm" button (step S808), the user may place the comment, in this case in the form of a box, onto the floor map by pressing the intended corresponding icon. Once this action is performed, the application 101a places the comment box onto the floor map adjacent to the corresponding icon (step S809).

Figure 9D:
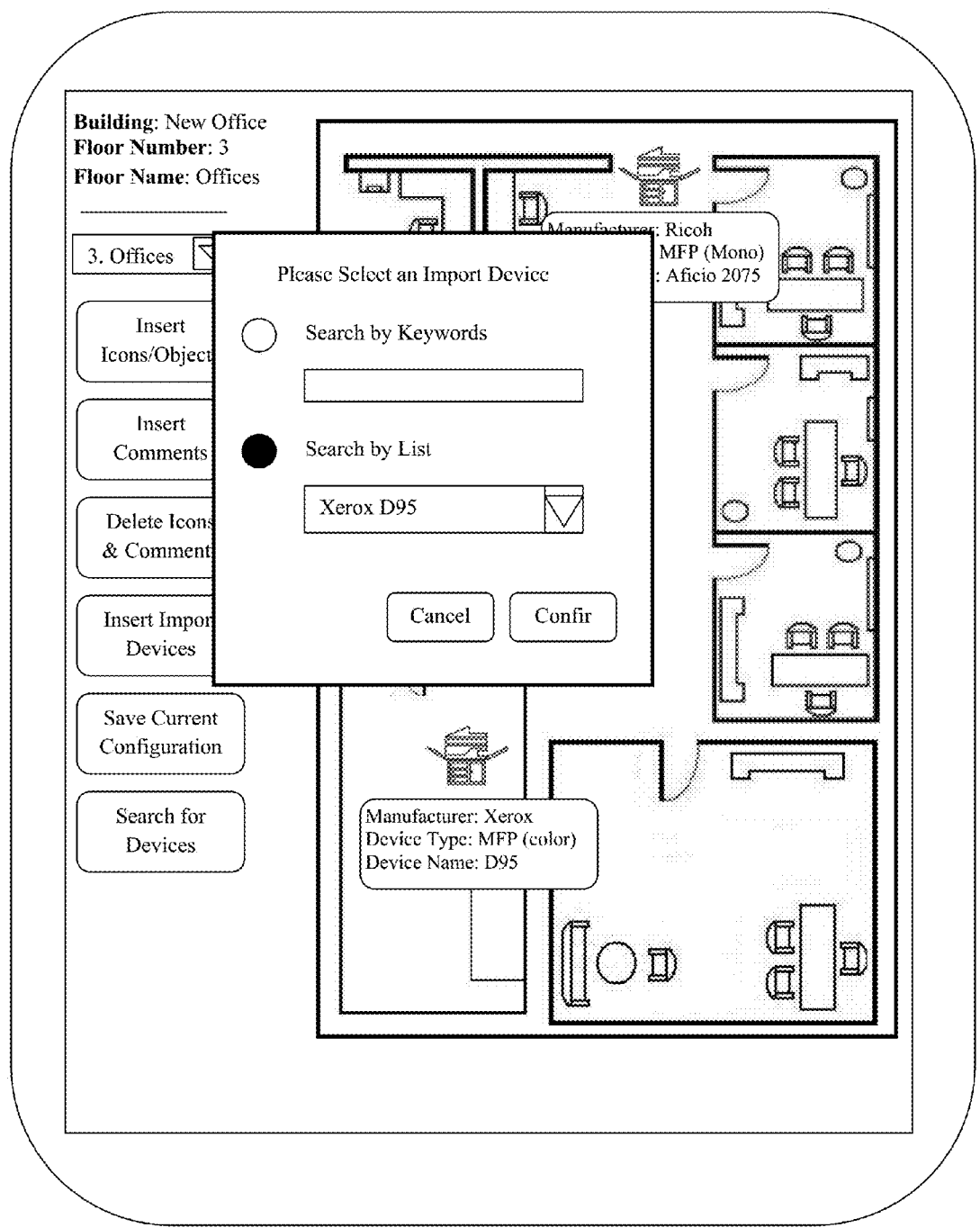

However, it should be appreciated that at least some of the device information input or imported by the user may also be inserted on the floor map instead of manually creating icons and comment boxes. For example, when the user presses the "Insert Import Devices" button, a user interface screen such as illustrated in FIG. 9D may be displayed. Such screen allows the user to search by keyword for devices for which information has been input or imported. For example, the user may type in the characters that make up the model name of a device or the user may instead type in the manufacturer's name. In addition, the user may also perform a search through a list instead. In this case, the user may click on the triangle-shaped button to have a drop down list appear and then from that drop down list, select a device. After performing the selection of the device, the user may press the "Confirm" button which causes the application 101a to present to the user with an icon and comment box corresponding to the selected device. The user may then move the icon and comment box to any position on the floor map. After confirming the position of the icon the application 101a then automatically moves the comment box to an area adjacent to the icon of the floor map.

Figure 9E:
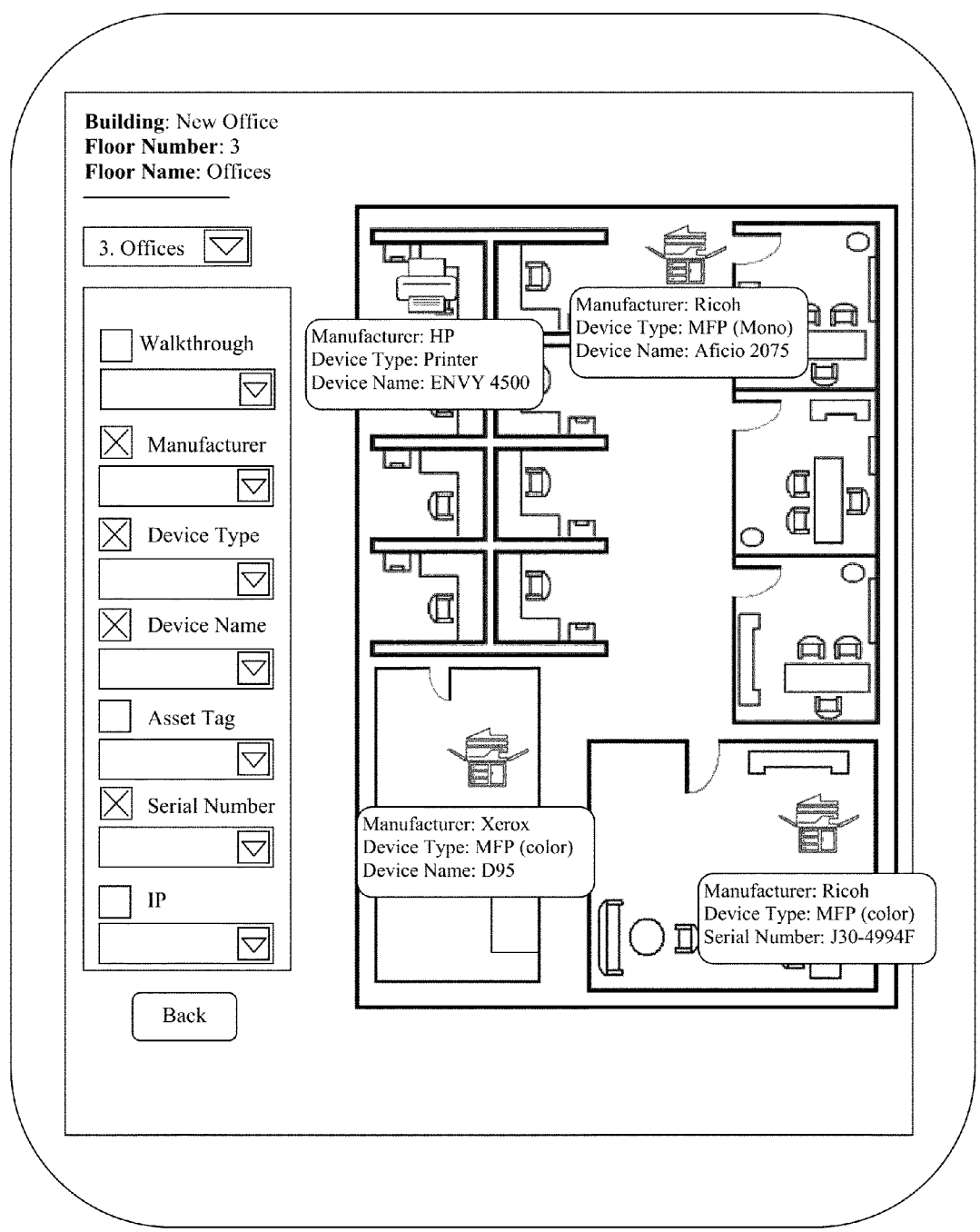

After the user has finished placing the icons and comment boxes onto the map, the user may press the "Save the Current Configuration" button to save the edited map. Next, the user may view the saved map by pressing the "View/Edit Existing Maps" button as shown in FIG. 7B which causes the application 101a to present the user with the screen illustrated in FIG. 9E. As shown, the left portion of the screen shows a listing of device information. Each category of the device information (e.g., Walkthrough ID, Manufacturer, Device Type, etc.) contains a box to the left of it. The significance of this box is that it allows the user to set what information is to be provided in the comment box. For example, as shown, the user has checked each box for or, in other words, selected the categories for "Manufacturer", "Device Type", "Device Name" and "Serial Number". What this means is that the comment box displays only that information. It does not show "Walkthrough ID" or "Asset Tag" because the user did not select those categories to be displayed in the comment boxes.

Further, as stated before, the devices may not all have the same information. For example, the terminal 101 may have information regarding the manufacturer, device name and serial number for a printer A. However, a printer B which is a prototype designed by several engineers in the organization may not have information regarding a manufacturer or even a serial number. Thus, the devices may not all have the same information. This is important since if the user selects a certain category to be shown in the comment box, that category is not displayed for a device that lacks information for that category. For example, as shown in FIG. 9F, the user has selected the categories for "Serial number" and "Device Name". However, only the devices at the top left, top right and bottom left of the map includes information for "Device Name". As a result the comment box displays that information. On the other hand, the device at the bottom right of the map does not include information for "Device Name". Consequently, the comment box does not display the "Device Name" category. Instead, the device at the bottom right possesses information for "Serial Number" which is unlike the other three devices. As a result, it is displayed in the comment box.

Figure 10:
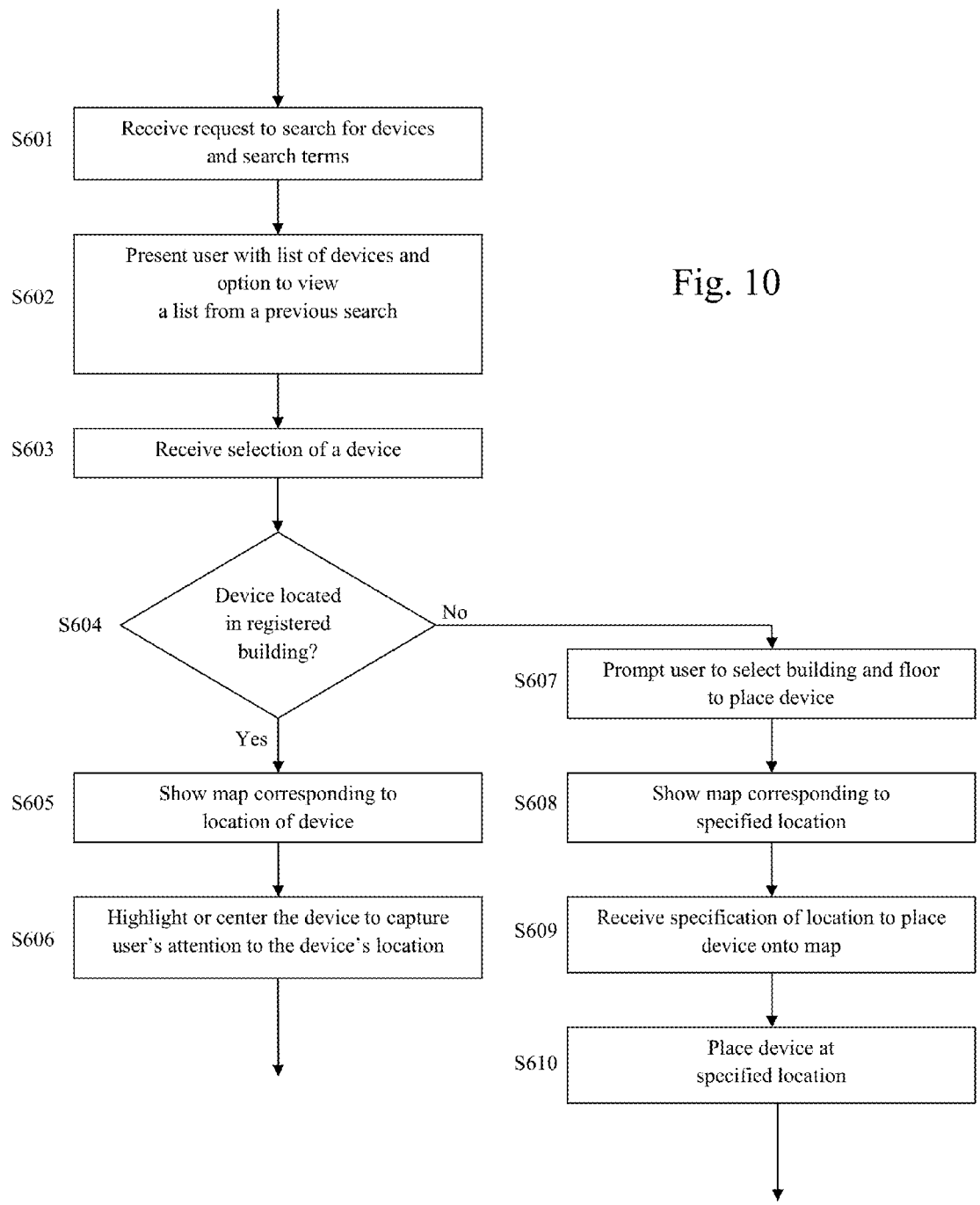
FIG. 10 shows a flow chart of a method performed by the application shown in FIG. 1.

FIG. 10 shows a process performed by a terminal (e.g., 101) to search for devices, according to an exemplary embodiment.

Figure 11A:
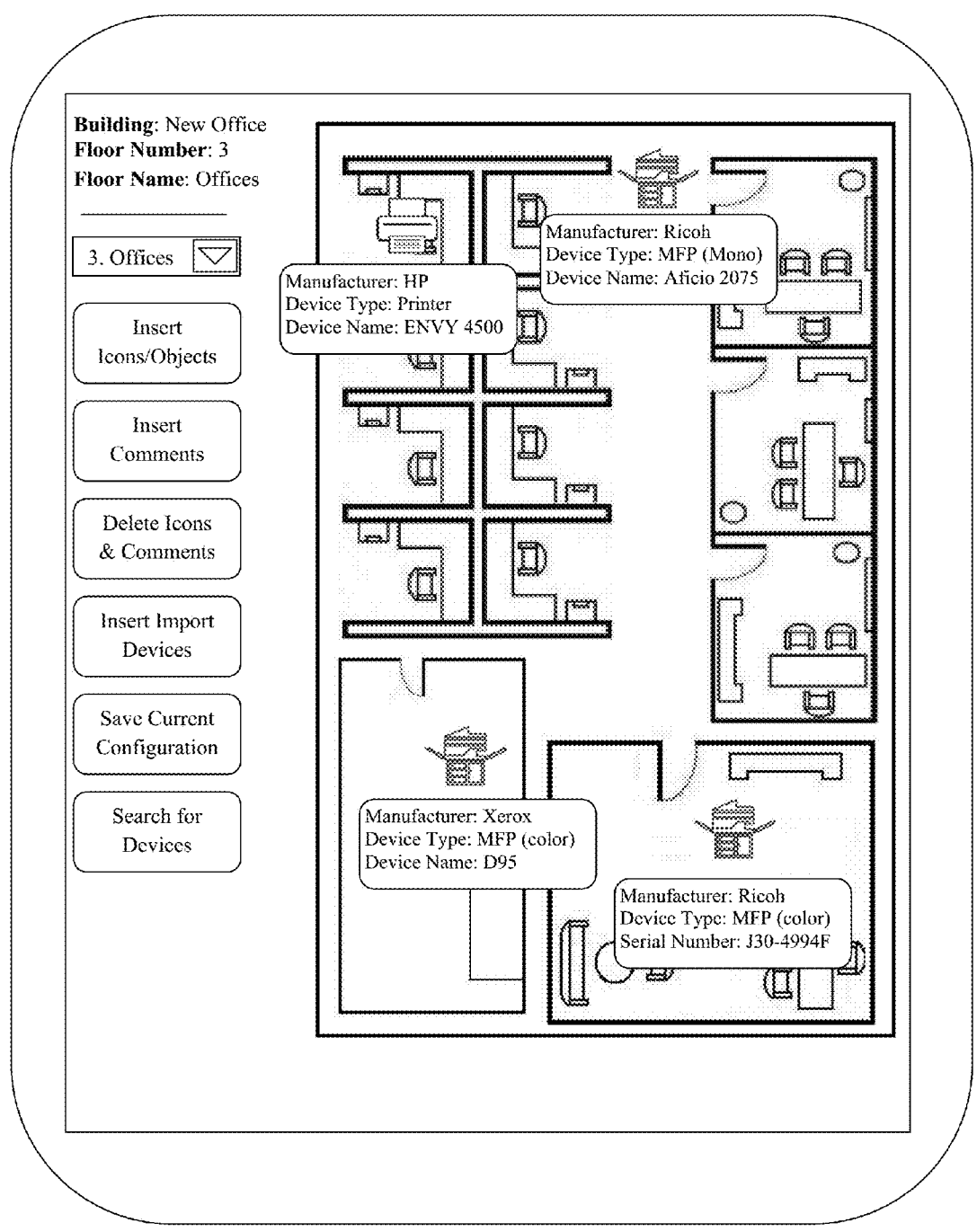
FIGS. 11A-11H show examples of user interface screens provided by the application, according to an exemplary embodiment.
Figure 11B:
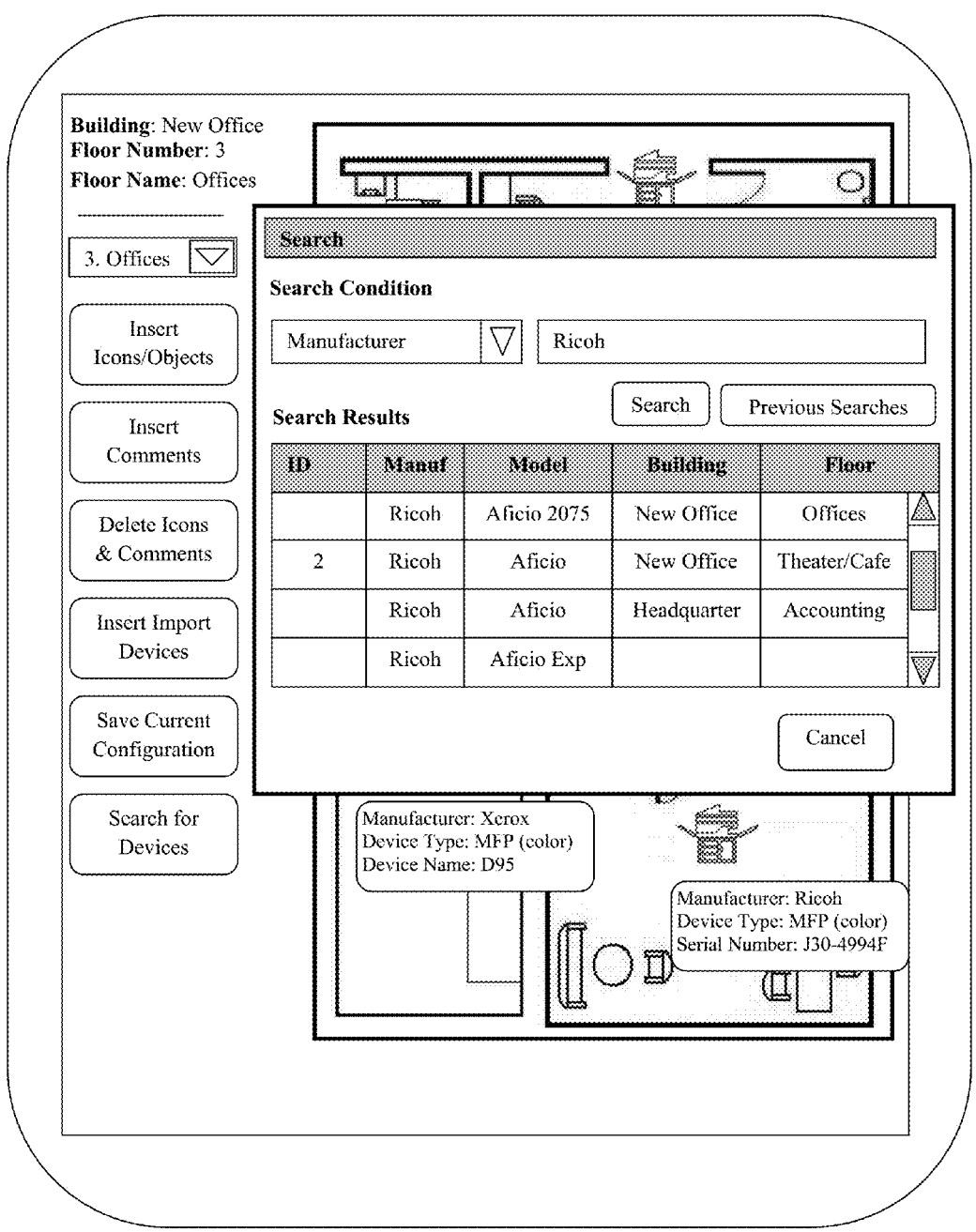

It is possible that the number of devices placed by the user onto the various floormaps of each building may be numerous. As a result, it may be difficult to keep track of which printers or MFPs are on which floors and buildings. To assist the user in monitoring the devices, the application 101a offers a search function which is activated by pressing the "Search for Devices" button as illustrated in FIG. 11A. The search function enables the user to search or find devices When the user requests to search for a particular device, the screen shown in FIG. 11B may be presented. As shown, in the "Search Condition" section, the user may (although not necessarily) select a category from a drop-down list. The category can be any of the categories mentioned supra (e.g., Walkthrough ID, Device Name, Device Type, Serial Number, etc.). In this case the user has selected the "Manufacturer" category. Next, the user may input terms, characters or keywords into the adjacent box. Unlike where the categories are fixed, the user may instead input any terms, characters or keywords that the user wants. In this case, the user has input "Ricoh" as the search term. After inputting the search term, the user may press the "Search" button to perform the search. This results in the "Search Results" section being filled with devices that have information that match the search term "Ricoh". As shown in the "Search Results" section, the user can view the matched devices' "ID (Walkthrough ID)", "Manufacturer", "Building" and "Floor". However, as illustrated in the "Search Results" section, if there was no previous information for one of the categories for a device, then it is not shown. For example, only one of the devices currently shown in the "Search Results" section includes information for the "Walkthrough ID" category. The rest does not have this information.

Figure 11C:
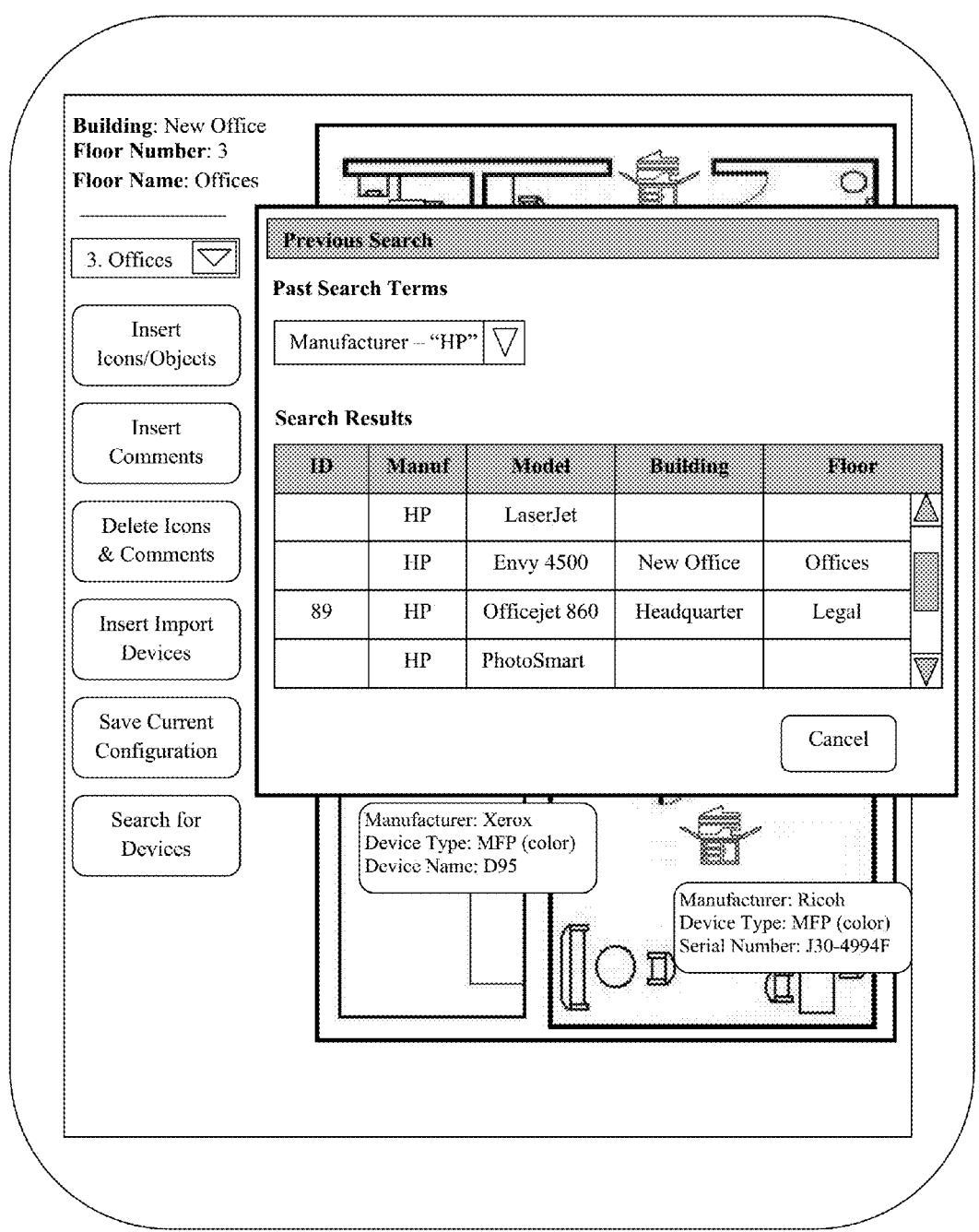

Further, it should be noted that the user may also access information regarding searches made in the past by pressing the "Previous Searches" button which is next to the "Search" button. After doing this, the application 101a presents to the user a screen as illustrated in FIG. 11C. Here, the user may select from the "Past Search Terms" section a search term that the user used previously. As shown, one example of how the search term is displayed may be through a drop-down list. Further, such search terms may be identified by the category (if any) that was previously selected and the corresponding search input. Thus, every time a user performs a search, the application 101a obtains the search terms (category and input) and records it along with the corresponding search results. Consequently, the user may elect at any time to access these records thereby increasing the convenience for the user.

Figure 11D:
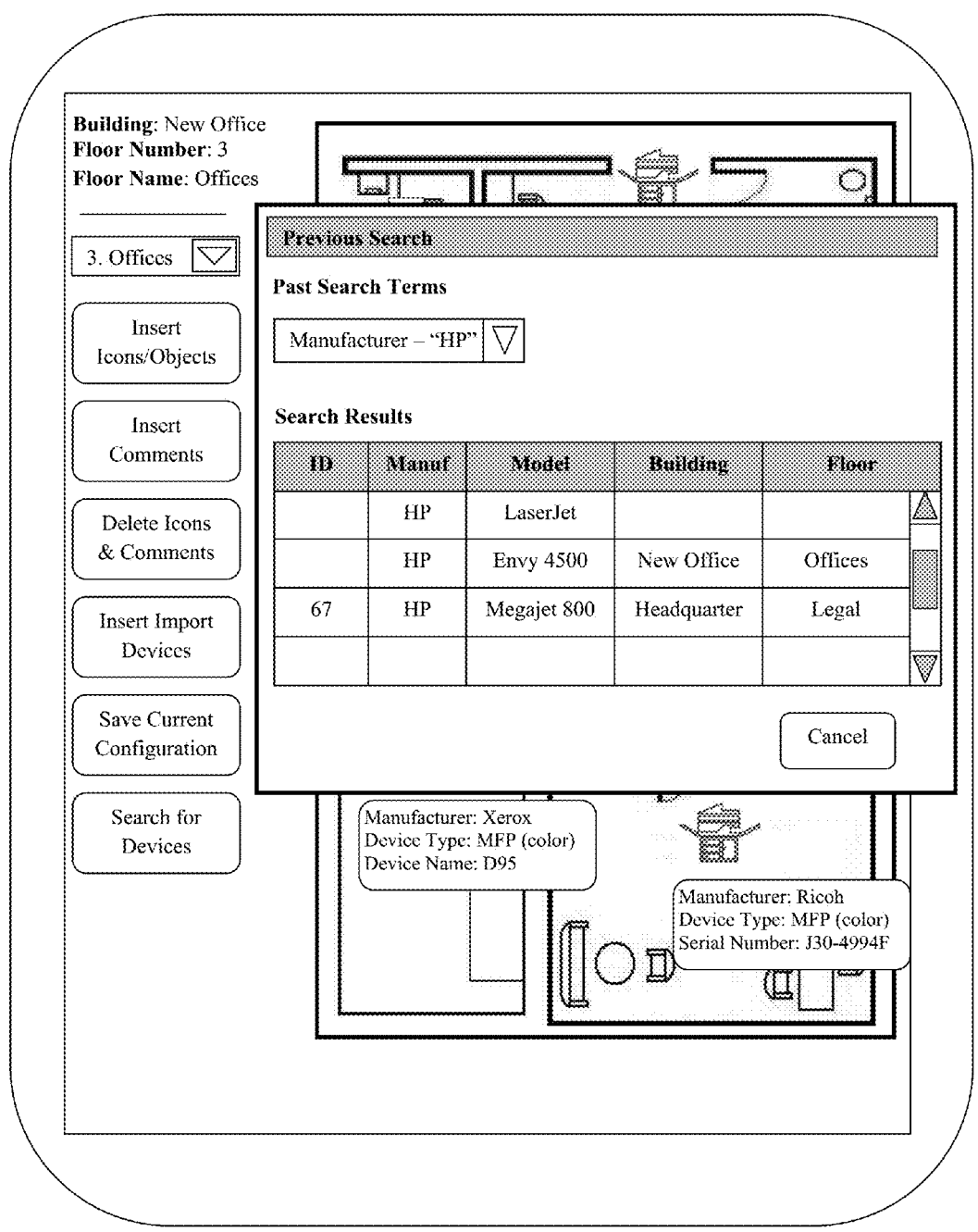

In an exemplary embodiment, the search results for previously made searches may also be updated as well. For example, the user may utilize the search terms "Manufacturer" and "Ricoh" for the first time and obtain a search result, such as shown in FIG. 11C. However, a month later, the user may access that search term and result again for the second time. The search results, as illustrated by FIG. 11D, shown the second time access may not be the same as the first time. After the user has selected the search term, the application 101a may perform an update. As shown the list displaying the search results for the second time, the device "HP Photosmart" is no longer on the list and the "HP Megajet 800" has replaced the "HP Officejet 860". This could be the result of throwing away old devices or replacing old devices with new ones. Thus, this feature is convenient for the user as it allows the user to monitor the device currently available.

Figure 11E:
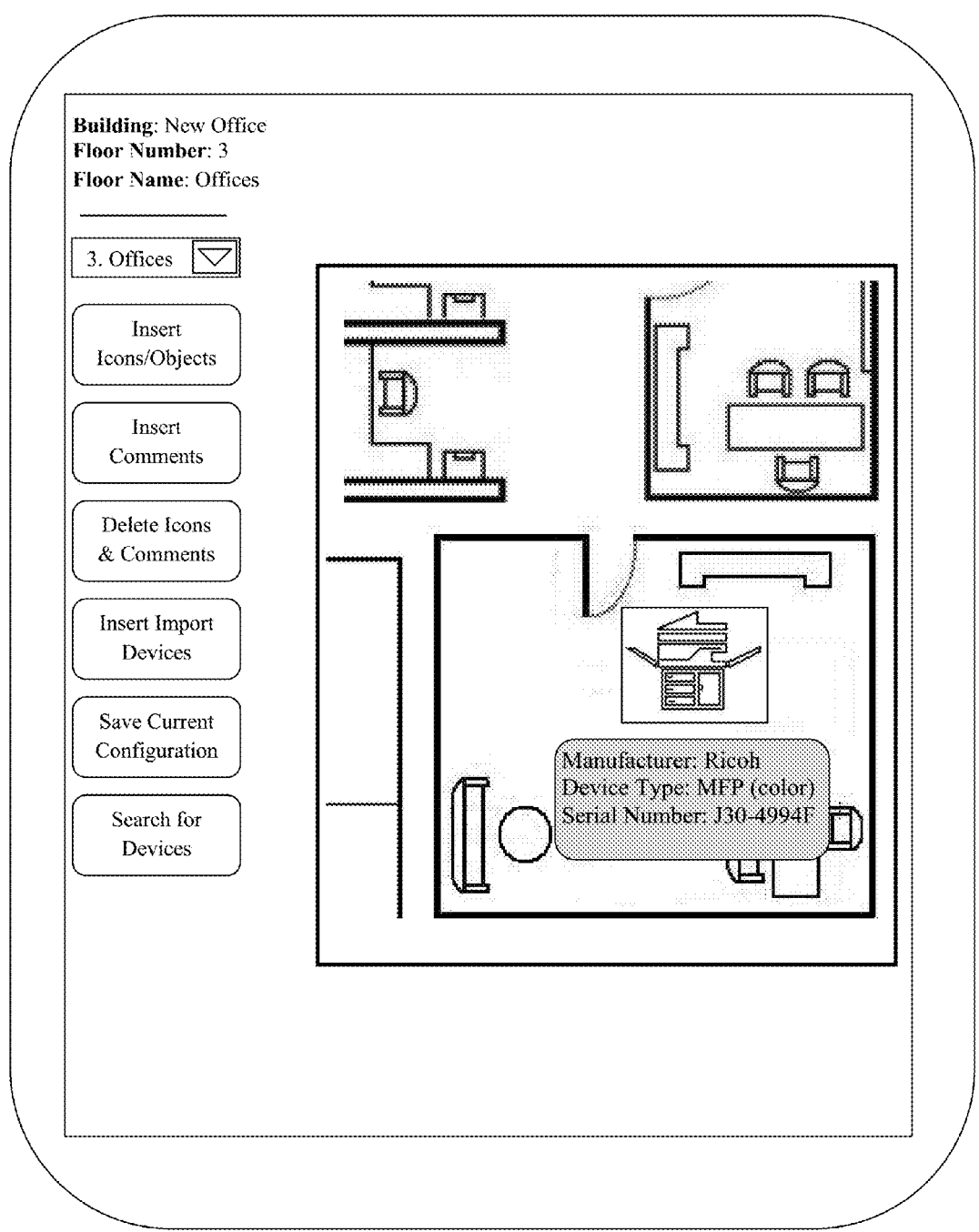

After displaying to the user the list of search results from the current search terms or a previously input search term (step S602), the user may select a device from the list. When the user selects a device, the application 101a makes a determination of whether the selected device is registered at a location in any of the buildings (step S604). In other words, the application 101a checks to see if the selected device had been previously placed onto a floormap in any of the buildings. In the case that the selected device is registered in a floormap (step S604, yes), the application 101a presents to the user a floor map containing the registered device which is also superimposed over the search results (step S605) as illustrated in FIG. 11E. In this case the user has selected an MFP made by a manufacturer called "Ricoh" with a serial number of "J30-4994F" which is located in large office to the bottom right. As shown, the application 101a centers the map toward the location of the selected device and also highlights it (step S606). Thus this captures the user's attention of where the selected device is located at thereby creating ease for the user. Further, the terminal may also zoom into the location as well.

Figure 11F:
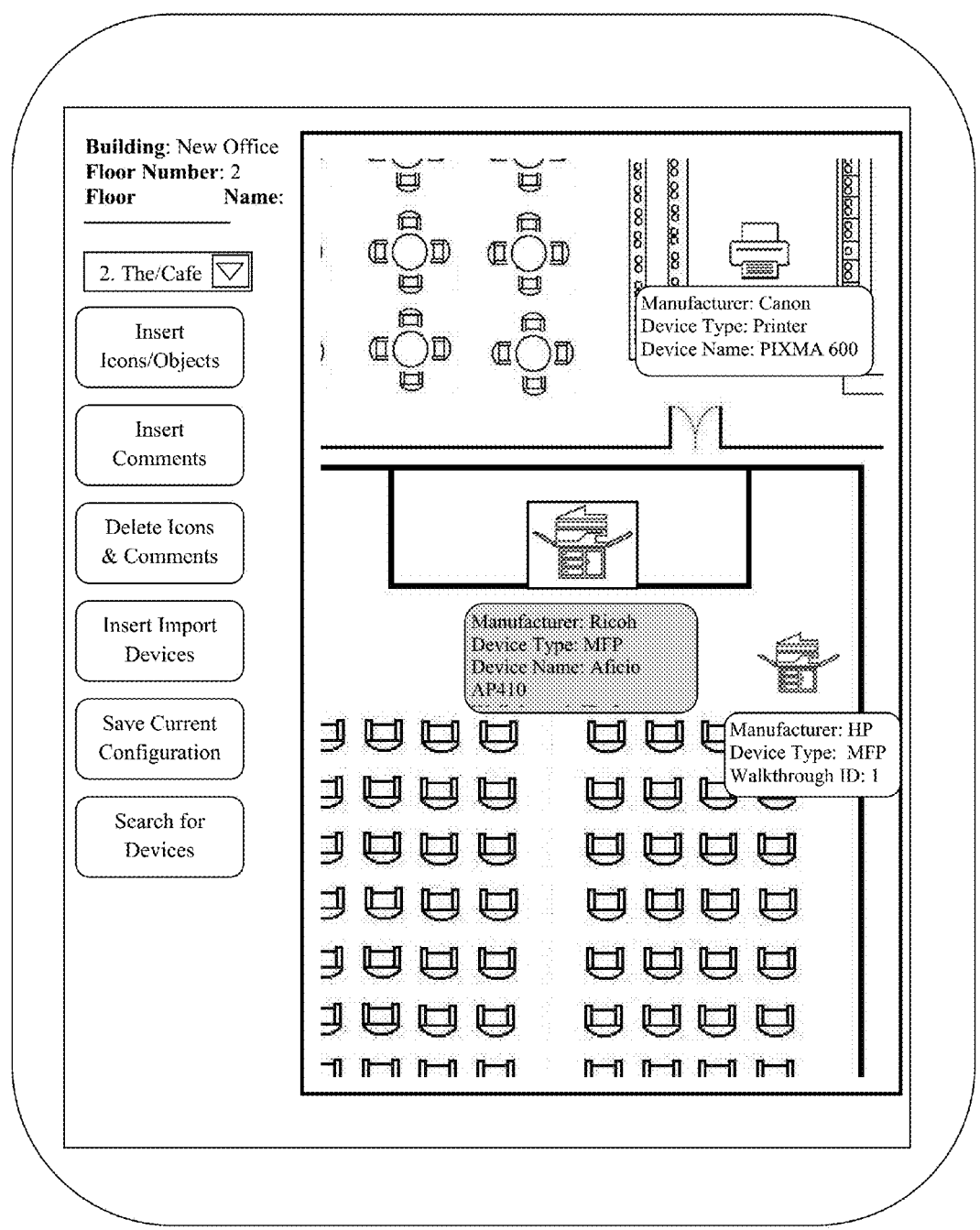
Figure 11G:
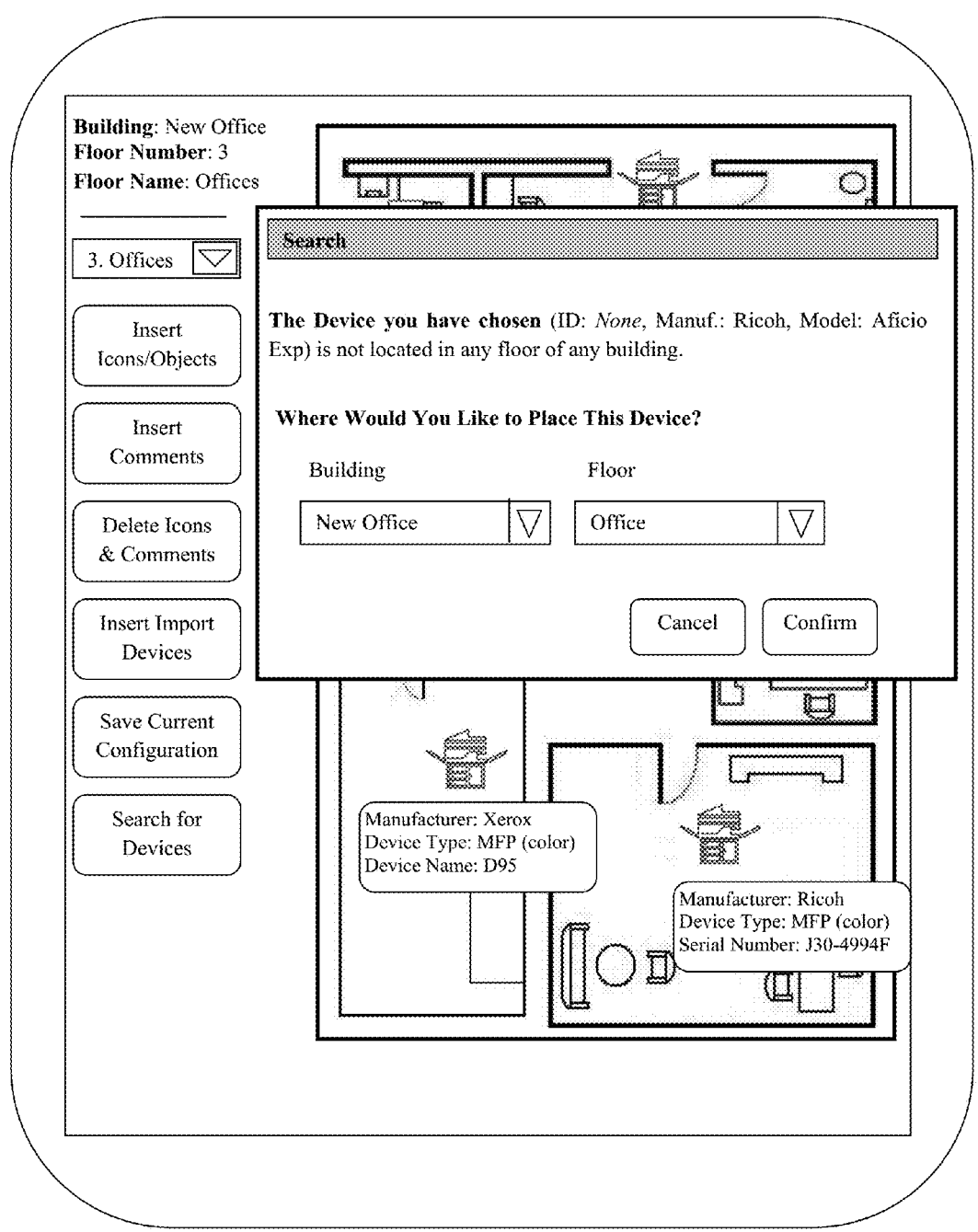
Figure 11H:
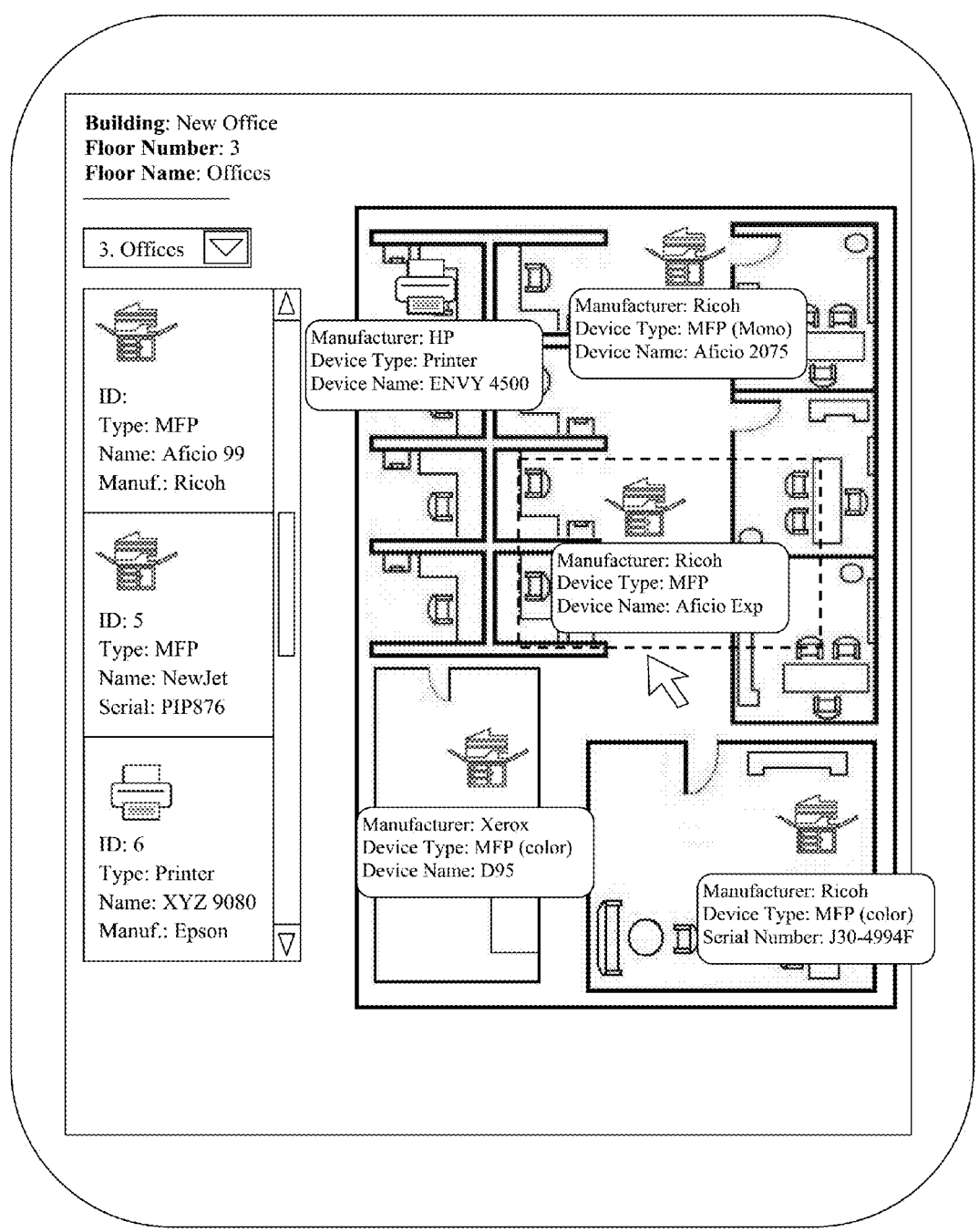

In an exemplary embodiment, the selected device may not be on the same floormap as the floormap the user is currently viewing. For example, the user is currently viewing a floormap of the third floor (i.e. Offices) of the building "New Offices", such as shown in FIG. 11A. However, the user may perform a search and select a device from the search results that is not located on the floormap "Offices". In the case that this occurs, the application 101a may replace the current floormap with the floormap of the location of the selected device. For example, as shown in FIG. 11F, the user has selected an MFP made by a manufacturer called "Ricoh" with a device name of "Aficio AP410" and a Walkthrough ID of "2". Because this device is not located on the floormap of "Offices", the application 101a presents the user with the floormap of "Theatre/Cafeteria" which is the location of the device. Further, the device may be centered and/or highlighted.

In the case that the selected device is not registered in any floormap of any building (step S604, no), the application 101a may prompt the user to select a location (i.e. building and corresponding floor) to place the selected device (step S609) as shown in FIG. G. Here the user is shown the information of the selected device to ensure that the user has selected the right one and the user is also given the option of selecting the building and the corresponding floor on which the user wishes to place the selected device. In this case, the user has elected to place the device on the floormap "Offices" of the building "New Offices". After pressing the "Confirm" button the application 101a presents the floormap selected by the user (step S608) to the user as shown in FIG. H. The user is now able to freely place the device wherever the user wants as designated by the arrow next to the device. The device is in a dotted box to emphasize that it is the device being currently placed. After receiving the location to place the device from the user (step S609), the application 101a places the device onto the floormap (step S610).

In an exemplary embodiment, the application 101a may also present to the user the option of placing other devices that have not been yet associated with a floormap. On the left side of FIG. H, there is a list of devices which have not been placed on any floormaps. The user may click each device and drag-and-drop the selected device onto the floormap. Thus, the user does not have to perform the tedious task of searching for devices that have not yet been associated with a floormap. The user may instead first select one unplaced device and place it onto the floormap, and thereafter have the option of placing the other unassociated devices onto a floormap (i.e. the same floor map or another floormap). Thus, this feature provides the user with the convenience to place all the unassociated devices with ease.

The orders in which the steps are performed in the aforementioned methods are not limited to those shown in the examples of FIGS. 6, 8 and 10, and may be switched as long as similar results are achieved. Also, it should be noted that the methods illustrated in the examples of FIGS. 6, 8 and 10 may be implemented using any of the systems described in connection with FIGS. 2A and 2B.

Various aspects and features of this disclosure have been discussed supra by reference to an example in which the aspects and features are provided by a device information management application. It should be appreciated that the "device information management application" can be any application that allows the use to access and add device information to a digital map, and may encompass and/or operate in conjunction with a map application.

For example, the device information management application and/or the map application may enable the user to organize device location information and/or map information, by creating floors for a site, and for each floor, create and associate a map with the floor. For example, the user may upload a floormap image file to the system, and can place device an icon on the floormap via drag and drop. The device icons can vary, such as based on device type (e.g., copier, printer, scanner, fax, MFP, etc.), configuration (e.g., color or mono, A3 or A4 paper available, networked or non-networked, etc. Thus, users can easily see the actual arrangement of devices on floormaps. However, if the number of floormaps and the number of placed devices are large, it may be difficult to locate a device (of particular, desired device characteristics) on a floormap.

In order to avoid a large amount of time to find a device on a floormap, the application may be configured to have a search function to locate devices on a floormap (or even devices not placed on any floormaps), and thus the user can more readily find a target device of specific desired device characteristics in the system. For example, the search function may be invoked by clicking a search icon that is provided by the application, and followed by input of search criteria. In response to the search request, application matches the search criteria to device data and shows search results which include devices matching the criteria. Further, when a device displayed in the search results is selected, the application shows a floormap again and preferably highlights and/or centers the device icon.

In the case that a site has multiple floors (and therefore multiple respectively floormaps) and one floormap (of the selected floor) is shown at a time, the selected target device may be on a floormap which is not currently displayed, and in such instance, the application can be configured to switch the display to the floormap which includes the selected device. For example, the current display shows the floormap for Floor A, and when the user selects, from search results, a device placed on Floor B, the floormap for Floor B may be displayed with the device icon of the selected device centered in the display.

Further, some devices in a device database may not be assigned to any floors (nor any floormap), and thus such devices are not displayed on any floormaps. In a case that such a device can nevertheless be returned in the search results, when it matches the search criteria (or if the user requests to have a list of the unplaced device). The user can also requests a list of the floormaps, select one of the floormaps for display, and drag and drop a selected device, that was unplaced upto then, on the displayed floormap.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A device information management application including one or more programs of instructions embodied in a non-transitory computer readable medium and executable by a computer, wherein the device information management application executable by the computer comprises:
   a floormap interface configured to register one or more floormaps, plural devices and associated device locations on the floormaps;
   a search interface configured to receive user entry of one or more device search terms and configured to match the search terms to the devices registered by the floormap interface and return a list of matched devices,
   wherein the floormap interface includes
   a device listing display portion to display, on a display device of the computer, selectable device objects corresponding to the matched devices returned in the search result, and
   a floormap display portion to display, on the display device of the computer, in response to user selection of one of the selectable device objects, a floormap associated with the selected device object to be displayed and highlight or center the matched device corresponding to the selected device object, on the displayed floormap,
   wherein when a device object displayed in the device listing display portion has no associated location information and is selected, a device placement user interface is displayed on the display device to permit placement of the device object at a user-specified location on a user-selected floormap.

2. The device information management application of claim 1, wherein the search interface causes the returned list of matched devices to be captured in a search result store, and wherein
   when the floormap is displayed in response to the user selection of the selected device object, the floormap interface removes the device listing display portion from display, while the list of matched devices remains captured in the search result store.

3. The device information management application of claim 2, wherein when the search interface performs another search, based on another set of user-specified search terms, the search interface causes search results based on said another set of user-specified search terms to be captured in the search result store while the list of matched devices remains captured in the search result store, and each of (i) the list of matched devices and (ii) the search results based on said another set of user-specified search terms is selectable by the user for display in the device listing display portion.

4. The device information management application of claim 3, wherein the search interface causes the one or more device search terms to be captured along with the corresponding list of matched devices in the search result store, and causes said another set of user-specified search terms to be captured along with the search results based on said another set of user-specified search terms in the search result store, and wherein
   when the list of matched devices is selected for display again in the device listing display portion, the search interface performs the search based on the corresponding one or more device search terms once again to update the list of matched devices, and updated device objects corresponding to the updated list of matched devices are displayed in the device listing display portion.

5. The device information management application of claim 1, wherein the search interface causes said one or more device search terms, corresponding to the list of matched devices, to be captured in a search archive store, and when the search interface is once again activated for performing another search, the device search terms captured in the search archive store is automatically retrieved from the search archive store and presented for selection, or editing, for said another search.

6. The device information management application of claim 1, further comprising:
   an application user interface including a search object which is user selectable to cause the search interface to be activated and displayed for user entry of search terms.

7. The device information management application of claim 6, wherein the application user interface including the search object is displayed while the floormap is displayed.

8. The device information management application of claim 6, wherein the application user interface including the search object is displayed while the device listing display portion is displayed.

9. The device information management application of claim 1, wherein when a device object corresponding to another matched device in the device listing display portion is selected while the floormap is displayed in the floormap display portion, and a location of said another matched device is not in the displayed floormap but is in another floormap registered by said floormap interface, the displayed floormap is replaced, in the floormap display portion, by said another floormap retrieved from said floormap interface.

10. The device information management application of claim 1, wherein when an unplaced device object selected from the device listing display portion has no associated location information, a device placement user interface including a list of unplaced devices, amongst the plural devices registered by the floormap interface, and having no floormaps associated with the unplaced devices, is displayed along with a list of floormaps, and when one of the floormaps on the list is selected, the selected floormap is displayed in the floormap display portion, and wherein
   the device placement user interface is configured for drag-and-drop operation to place an unplaced device object, selected from the list of unplaced devices, onto a specified location on the displayed floormap.

11. The device information management application of claim 10, wherein said another matched device is highlighted or centered in said another floormap displayed in the floormap display portion.

12. The device information management application of claim 1, wherein the device listing display portion displays the device objects along with information indicating associated device locations of the corresponding matched devices.

13. The device information management application of claim 12, wherein when an unplaced device object having no location information displayed in the device listing display portion is selected, a device placement user interface is displayed to permit the device object to be placed at a user-specified location on a user-selected floormap.

14. The device information management application of claim 1, wherein the floormap displayed in response to the user selection of the selected device object is superposed over, at least a part of, the device listing display portion.

15. A method performed by a device information management application, the method comprising:
    registering one or more floormaps, plural devices and associated device locations on the floormaps;
    receiving through a search interface one or more user-entered device search terms, matching the search terms to one or more of the registered devices and returning a list of matched devices;
    displaying, on a display device, selectable device objects corresponding to the matched devices returned in the search result;
    displaying, on the display device, in response to user selection of one of the selectable device objects, a floormap associated with the selected device object to be displayed, and highlighting or centering the matched device corresponding to the selected device object, on the displayed floormap, and
    displaying, on the display device, a device placement user interface including a list of floormaps and a list of unplaced devices having no floormaps associated with the unplaced devices, when the selected device object is an unplaced device object not associated with any floormaps,
    wherein when one of the floormaps listed in the device placement user interface is selected, the selected floormap is displayed in a floormap display portion, and
    wherein the device placement user interface is configured to receive user operation to drag-and-drop an unplaced device object, selected from the list of unplaced devices, onto a specified location on the displayed floormap.

16. The method of claim 15, further comprising
    replacing the displayed floormap with another floormap, when another device object, which corresponds to another matched device which is not associated with the displayed floormap but is associated with said another floormap, is selected while the displayed floormap is displayed.

17. A device information management application including one or more programs of instructions embodied in a non-transitory computer readable medium and executable by a computer, wherein the device information management application executable by the computer comprises:
    a floormap interface configured to register one or more floormaps, plural devices and associated device locations on the floormaps;
    a search interface configured to receive user entry of one or more device search terms and configured to match the search terms to the devices registered by the floormap interface and return a list of matched devices,
    wherein the floormap interface includes
    a device listing display portion to display, on a display device of the computer, selectable device objects corresponding to the matched devices returned in the search result, and
    a floormap display portion to display, on the display device, in response to user selection of one of the selectable device objects, a floormap associated with the selected device object to be displayed and (i) highlight or center and (ii) zoom in on a matched device corresponding to the selected device object, on the displayed floormap.

* * * * *